(12) United States Patent
Parker et al.

(10) Patent No.: US 7,850,513 B1
(45) Date of Patent: Dec. 14, 2010

(54) HIGH EFFICIENCY SOLAR POWERED FANS

(75) Inventors: Danny Parker, Cocoa Beach, FL (US); Bart Hibbs, Simi Valley, CA (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 39 days.

(21) Appl. No.: 12/183,279

(22) Filed: Jul. 31, 2008

Related U.S. Application Data

(63) Continuation-in-part of application No. 11/433,888, filed on May 12, 2006, now Pat. No. 7,507,151.

(51) Int. Cl.
*F24F 7/007* (2006.01)
*H02N 6/00* (2006.01)

(52) U.S. Cl. .................. 454/228; 454/230; 454/900; 416/63; 136/245; D13/102

(58) Field of Classification Search .................. 454/228, 454/230, 900; 416/63; 136/245; D13/102
See application file for complete search history.

(56) References Cited

U.S. PATENT DOCUMENTS 1,903,823 A  4/1933  Lougheed (Continued)

FOREIGN PATENT DOCUMENTS

AU        19987     *  5/1928

(Continued)

OTHER PUBLICATIONS

Solar Attic Fan Benefits—SDF-20 The World's Most Powerful Solar Attic Fan, Solar Dynamics Online Publication, 2005, 2 pages [Retrieved on Feb. 17, 2008], Retrieved from the Internet: <URL : http://web.archive.org/web/20050208003250/www.solardynamicsinc.com/page3.html.

(Continued)

*Primary Examiner*—Steven B McAllister
*Assistant Examiner*—Patrick F. O'Reilly, III
(74) *Attorney, Agent, or Firm*—Brian S. Steinberger; Law Offices of Brian S. Steinberger, P.A.

(57) ABSTRACT

Highly efficient solar fans used in portable and built in configurations. A ventilation fan can be used for exhausting air out from underneath roofs, and/or for being portable in use and application. The fan can include optimized airflow blades having a twisted configuration that can move at a rotational speed operation of up to approximately 500 rpm. The approximately 15 inch diameter twisted blades can be premolded on a hub that together form a single molded unit of plastic. They can also be fabricated using metal. The unit can be mounted in an exhaust outlet having a conical diffuser on or adjacent to a roof. Another embodiment allows for portable solar powered fans used anywhere there is a need for ventilation and moving of air. The blades can rotate by a solar powered motor, where the blades and motor can generate up to approximately 1040 cfm while using no more than approximately 16 Watts. Portable fans can be powered by solar panels. One embodiment has solar panels mounted to a handtruck. Another embodiment has solar panels in a carrying case with a handle having leg(s) which can bend downward to different angled positions. The solar panel carrying case and the fan can each have single handles that allows for the portable fan assembly to carried and transported by both hands of a single user.

14 Claims, 35 Drawing Sheets

U.S. PATENT DOCUMENTS

| | | | | |
|---|---|---|---|---|
| 1,942,688 | A | 1/1934 | Davis | |
| 2,283,956 | A | 5/1942 | Smith | |
| 2,345,047 | A | 3/1944 | Houghton | |
| 2,350,939 | A | 6/1944 | Sprouse | |
| 2,430,225 | A | 11/1947 | Hagler | |
| 2,450,440 | A | 10/1948 | Mills | |
| 2,777,382 | A | 1/1957 | Solzman | |
| 2,830,779 | A * | 4/1958 | Wentling | 248/662 |
| 3,173,490 | A | 3/1965 | Stuart, III | |
| 3,416,725 | A | 12/1968 | Bohanon | |
| 3,854,845 | A | 12/1974 | Van De Water | |
| D242,616 | S | 12/1976 | Meyerhoff et al. | |
| 4,150,919 | A | 4/1979 | Matucheski | |
| 4,197,057 | A | 4/1980 | Hayashi | |
| D261,803 | S | 11/1981 | Bohanon, Jr. | |
| 4,325,675 | A | 4/1982 | Gallot | |
| 4,411,598 | A | 10/1983 | Okada | |
| 4,416,434 | A | 11/1983 | Thibert et al. | |
| 4,501,194 | A | 2/1985 | Brown | |
| 4,633,769 | A | 1/1987 | Milks | |
| 4,657,483 | A * | 4/1987 | Bede | 415/222 |
| 4,730,985 | A | 3/1988 | Rothman et al. | |
| 4,844,698 | A | 7/1989 | Gornstein et al. | |
| 4,974,633 | A | 12/1990 | Hickey | |
| 5,078,047 | A | 1/1992 | Wimberly | |
| 5,114,313 | A | 5/1992 | Vorus | |
| 5,131,888 | A | 7/1992 | Adkins, II | |
| 5,253,979 | A | 10/1993 | Fradenburgh et al. | |
| 5,522,943 | A * | 6/1996 | Spencer et al. | 136/245 |
| 5,588,909 | A | 12/1996 | Ferng | |
| 5,620,368 | A | 4/1997 | Bates et al. | |
| 5,814,906 | A * | 9/1998 | Spencer et al. | 307/150 |
| 6,039,533 | A | 3/2000 | McCabe | |
| 6,039,541 | A | 3/2000 | Parker et al. | |
| 6,201,181 | B1 * | 3/2001 | Azzam et al. | 136/244 |
| 6,306,030 | B1 | 10/2001 | Wilson | |
| 6,481,233 | B1 | 11/2002 | Calvert | |
| 6,589,018 | B2 * | 7/2003 | Chen | 417/14 |
| 6,659,721 | B1 | 12/2003 | Parker et al. | |
| 6,695,692 | B1 | 2/2004 | York | |
| 6,733,241 | B2 | 5/2004 | Bird | |
| 6,884,034 | B1 | 4/2005 | Parker et al. | |
| D510,316 | S * | 10/2005 | Hayakawa | D13/102 |
| D510,998 | S | 10/2005 | Parker et al. | |
| 6,971,820 | B2 * | 12/2005 | Rossabi et al. | 405/128.15 |
| 7,014,423 | B2 | 3/2006 | Parker et al. | |
| 2003/0116188 | A1 * | 6/2003 | Hsieh | 136/291 |
| 2004/0121720 | A1 * | 6/2004 | Gautney | 454/338 |
| 2004/0165986 | A1 | 8/2004 | Parker et al. | |
| 2005/0164627 | A1 * | 7/2005 | Boone, Jr. | 454/338 |
| 2006/0012331 | A1 * | 1/2006 | Gillette, II | 320/107 |
| 2008/0152482 | A1 * | 6/2008 | Patel | 415/121.3 |

FOREIGN PATENT DOCUMENTS

| | | | |
|---|---|---|---|
| JP | 01163543 A | * | 6/1989 |
| JP | 07253096 A | * | 10/1995 |
| JP | 09046922 A | * | 2/1997 |

OTHER PUBLICATIONS

Solar Attic Fan Technical Information, Solar Dynamics Online Publication, 2005, 2 pages [Retrieved Feb. 17, 2008], Retrieved from the Internet: <URL : http://web.archive.org/web/20050308021501/www.solardynamicsinc.com/page12.html.

* cited by examiner

FIG. 2A
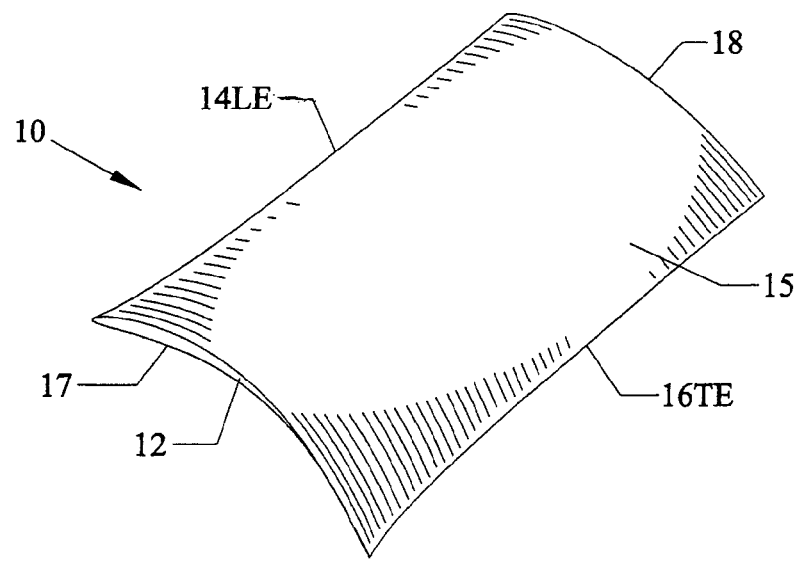
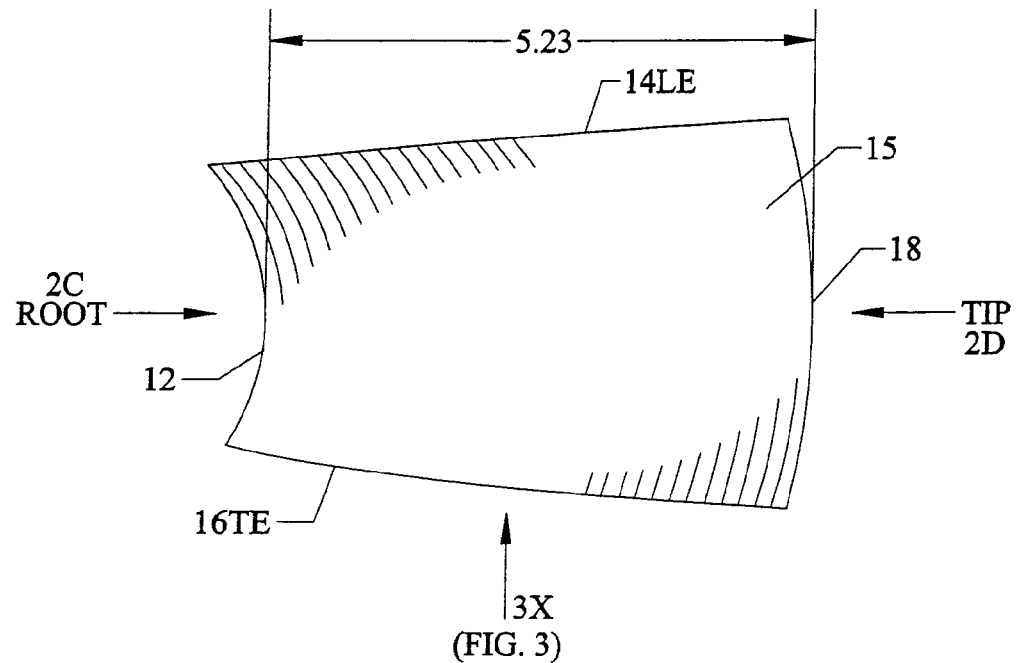
FIG. 2B

FIG. 2E
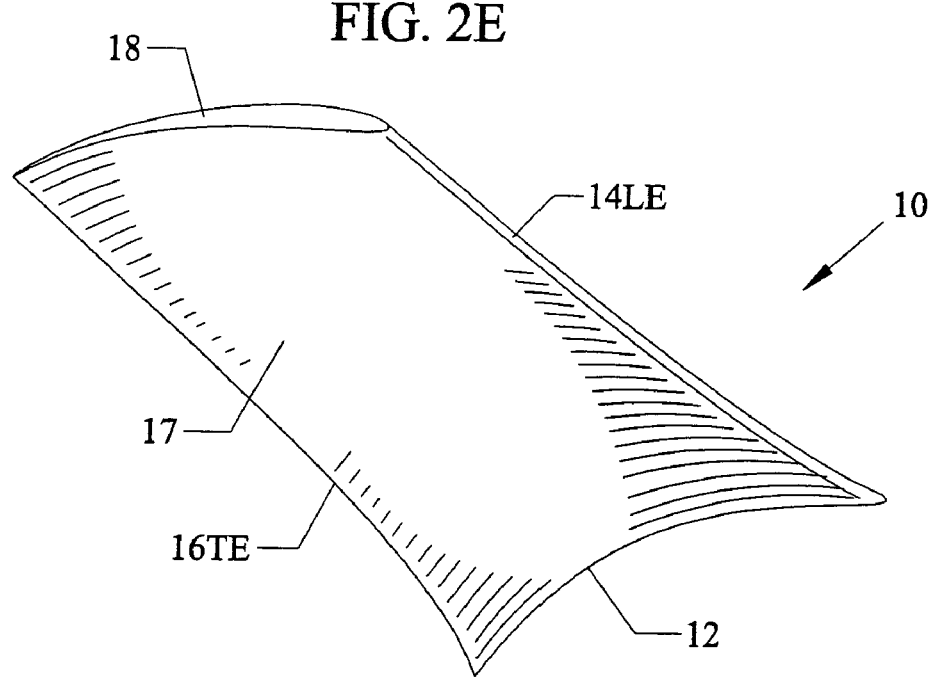
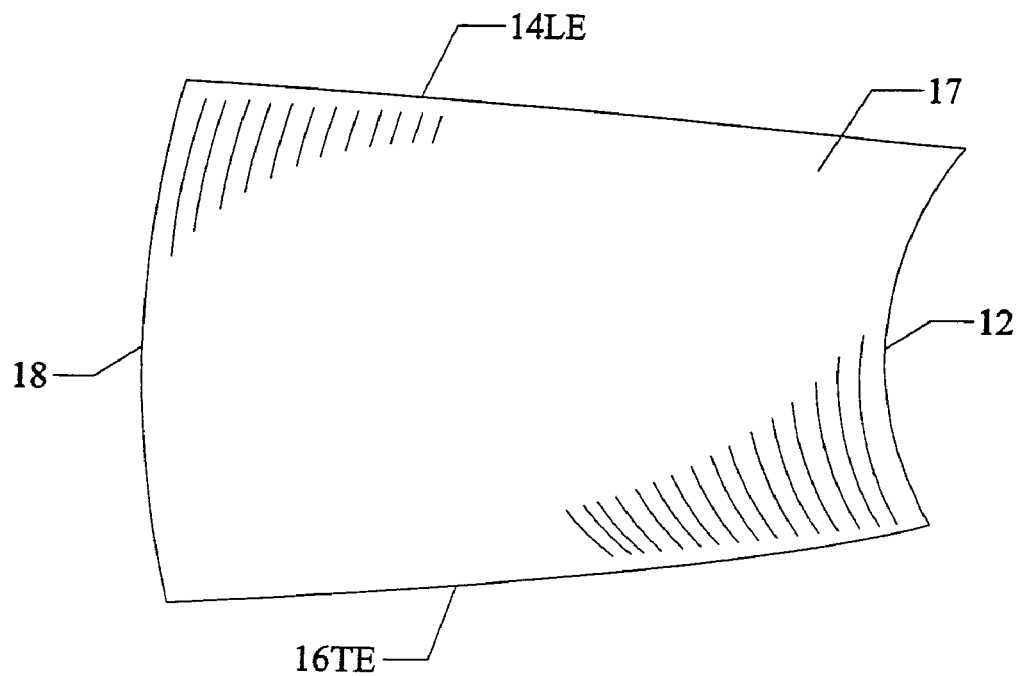
FIG. 2F

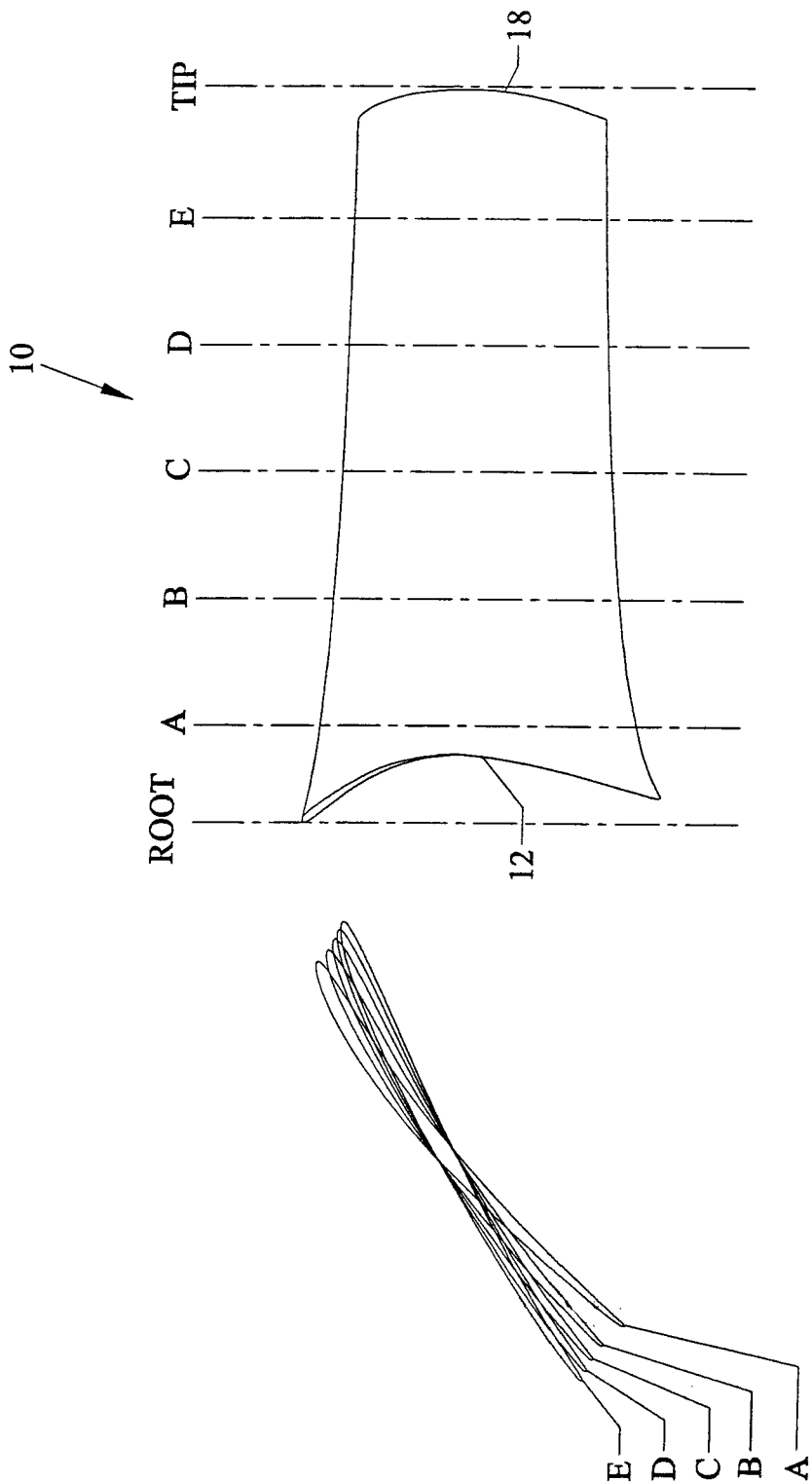

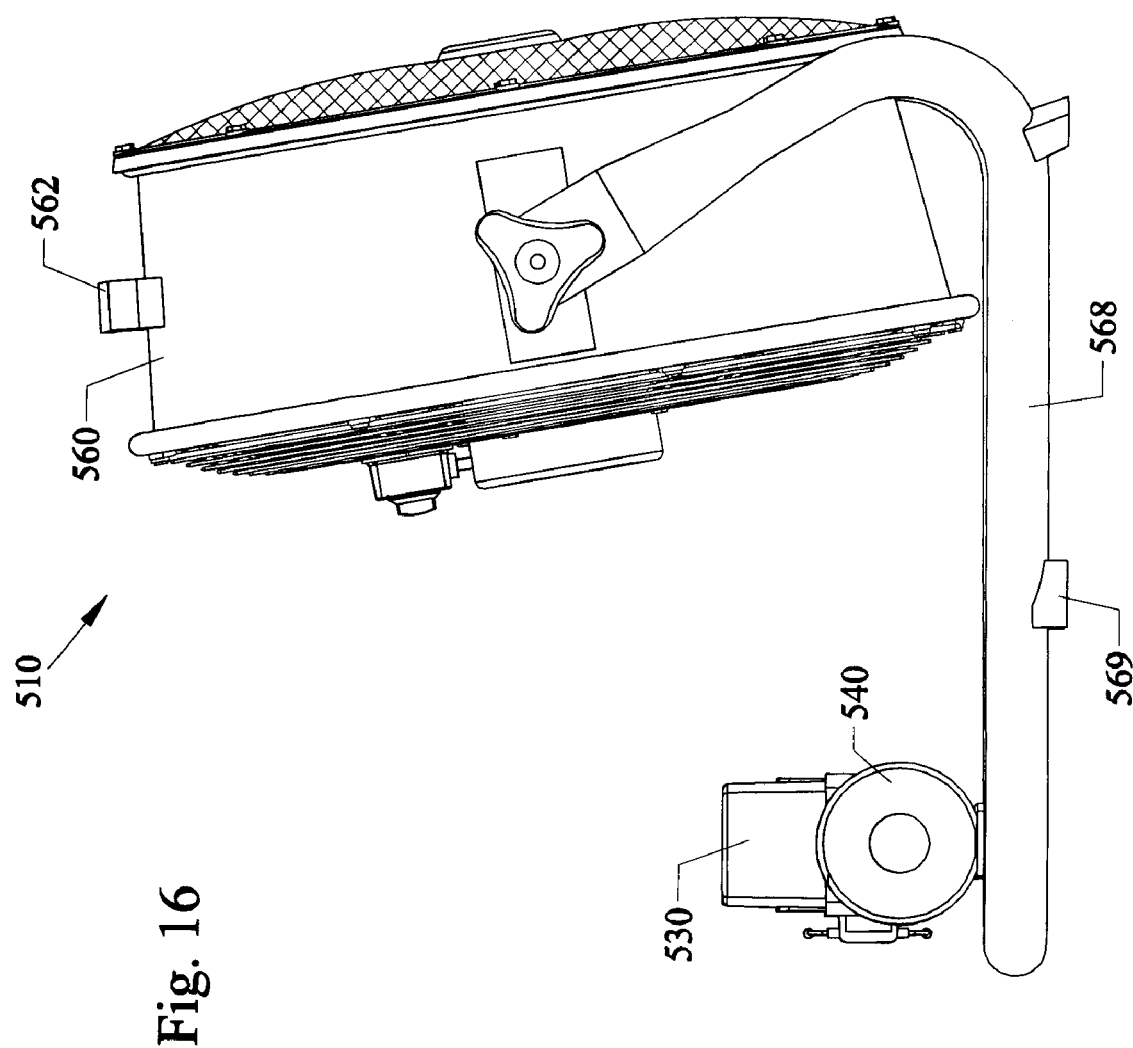

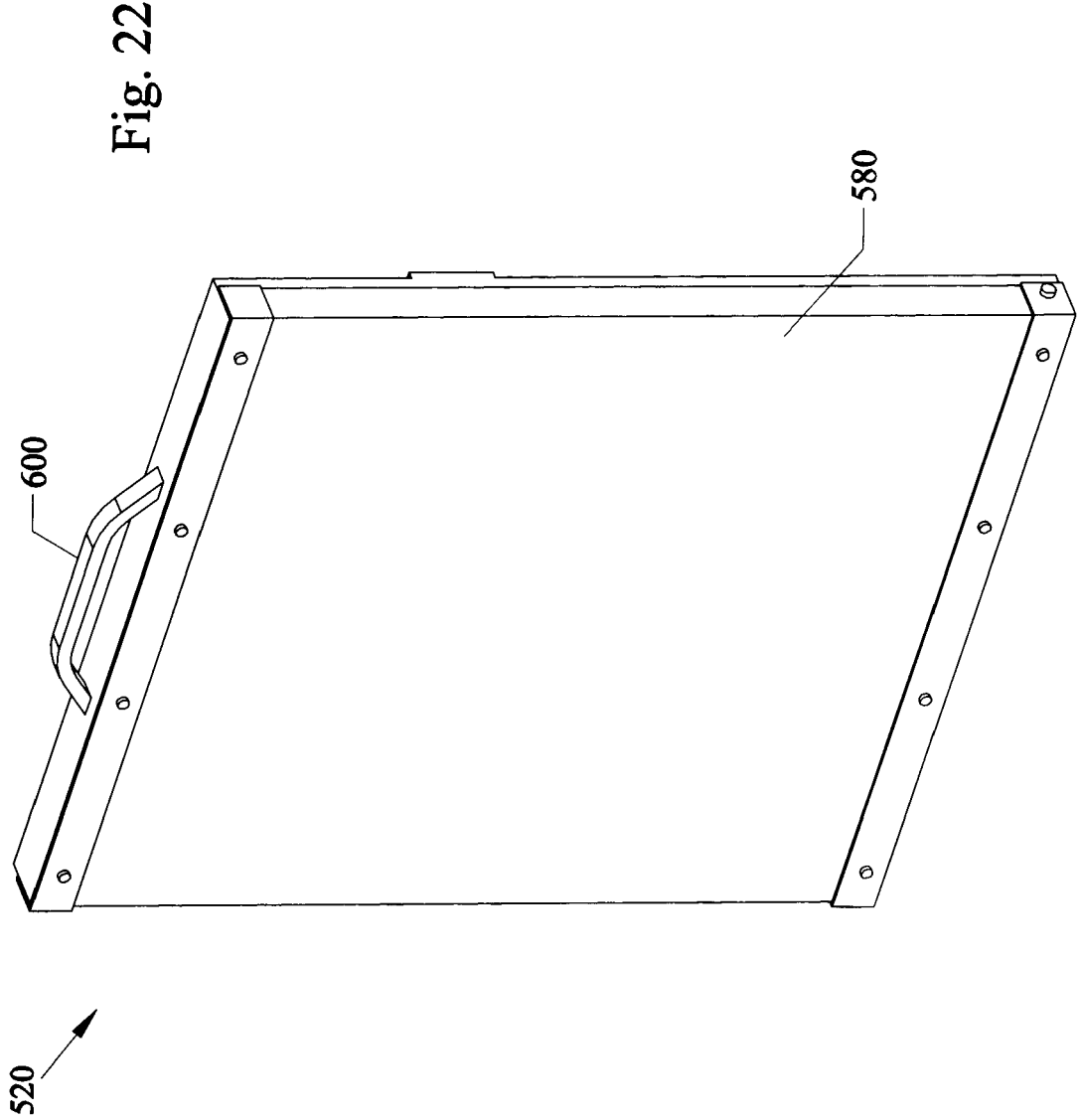

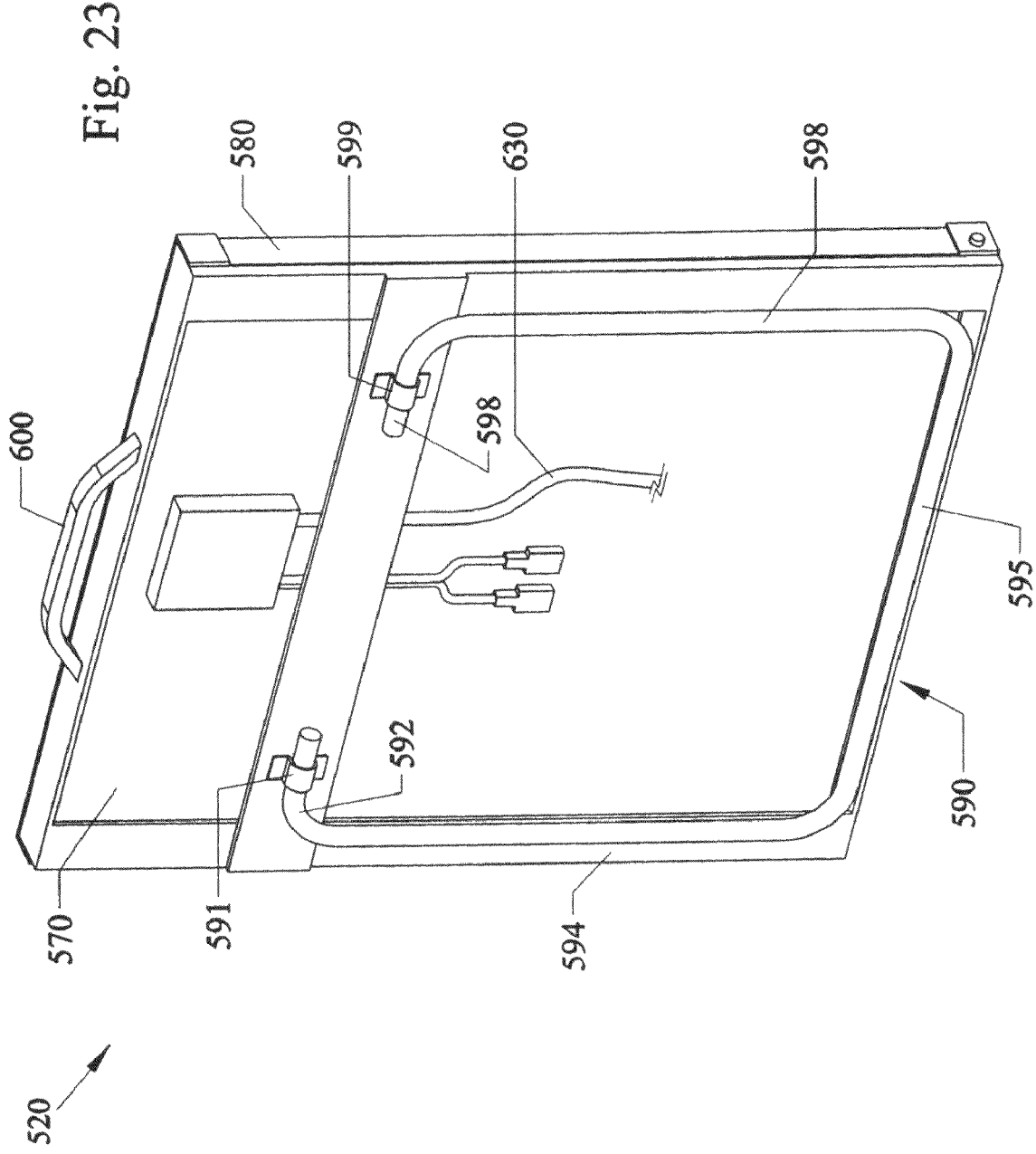

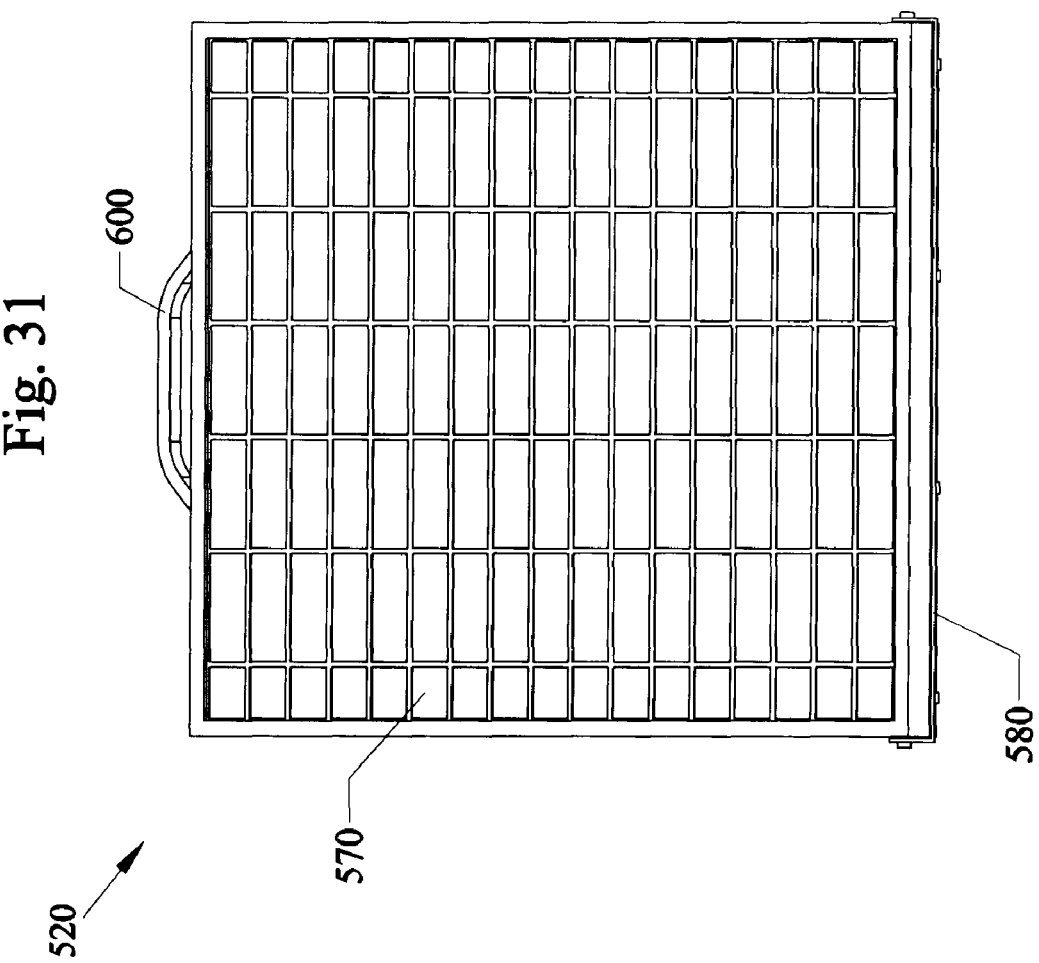

HIGH EFFICIENCY SOLAR POWERED FANS

This invention is a Continuation-In-Part of U.S. patent application Ser. No. 11/433,888 filed May 12, 2006, now issued as U.S. Pat. No. 7,507,151.

FIELD OF INVENTION

This invention relates to solar powered fans, and in particular to apparatus, devices, systems and methods of using optimized twisted blades as efficient attic exhaust fans and portable fans which are also solar powered and the portable fan modular components which are also easily carriable by users and include carrying cases with handles and fold down legs, and to methods of operating, using, housing and transporting the novel fans.

BACKGROUND AND PRIOR ART

Fans have been used over the years in semi-permanent mounts for ventilation of buildings, as well as in smaller configurations which allow the fan housings to be moved place to place. These types of fans traditionally require power supplies where power to the fan motors is derived through existing wiring in the buildings and/or through wall mounted power supplies. Additionally, most fans use planar shaped blades to move airflow which limits the amount of airflow that is moved at any given time.

Ventilation fans for venting hot air from attic areas underneath roofs have been increasing in popularity over the years. Hot air is known to accumulate under roof tops especially in attic areas. This buildup of hot air can lead to poor cooling conditions within the building and increased utility costs to run air conditioning systems and cooling systems, and the like. Thus, it is desirable to improve and maximize air removal rates from under roofs and from attic spaces, and the like.

Existing attic ventilation fans have been used but have substantial power requirements from existing building electrical supplies. For example, the GRAINGER® catalog sells an automatic power attic gable ventilator model number 4YN78 having metal type blades that rotate at 1050 RPM (revolutions per minute) generating 1320 cfm (cubic feet per minute) and requires 200 Watts of power. Another GRAINGER® attic fan model 4YN77 generates a higher level of cfm (1620 cfm) but requires 225 Watts of power.

Most existing attic ventilation fans use standard stamped generally flat metal fan blades that have only fair air moving performance. Flat type blades are not designed to maximize moving of air.

Various attic type ventilation fans have been proposed over the years. See for example, U.S. Patents: Des. 261,803 to Bohanon, Jr.; 4,501,194 to Brown; 5,078,047 to Wimberly; 6,306,030 to Wilson; and 6,695,692 to York. However, none of the cited references, individually or in combination overcome all the problems with the prior art described above.

The inventors and assignee of the subject invention have been at the forefront of inventing high efficiency ceiling fans by using novel twisted blade configurations. See for example, U.S. Pat. Nos. 6,884,034 and 6,659,721 and 6,039,541 to Parker et al. However, these fans are designed for maximizing air flow from ceiling fans that have much larger diameters (approximately 42 inches to 64 inches, etc.) and that operate at different speeds (less than approximately 200RPM) than small diameter ventilation fans that are needed to exhaust air from underneath roofs and from attic spaces.

Additionally, the inventors and assignee have worked on air conditioner condenser fan blades (see for example, U.S. patents D510,998 to Parker et al. and 7,014,423 to Parker et al. However, the air conditioner condenser fans are not optimized for the ventilation and removal of air from underneath roofs and from attic spaces.

Aircraft, marine and automobile engine propeller type blades have been altered over the years to shapes other than flat rectangular. See for example, U.S. Pat. Nos. 1,903,823 to Lougheed; 1,942,688 to Davis; 2,283,956 to Smith; 2,345,047 to Houghton; 2,450,440 to Mills; 4,197,057 to Hayashi; 4,325,675 to Gallot et al.; 4,411,598 to Okada; 4,416,434 to Thibert; 4,730,985 to Rothman et al. 4,794,633 to Hickey; 4,844,698 to Gornstein; 5,114,313 to Vorus; and 5,253,979 to Fradenburgh et al.; Australian Patent 19,987 to Eather. However, these patents are generally used for high speed water, aircraft, and automobile applications where the propellers are run at high revolutions per minute (rpm) generally in excess of 500 rpm. None of these propellers are designed for optimizing airflow to remove undesirable air from attics and from underneath roofs.

Portable fans such as handheld battery fans have been used over the years. Similar to the problems presented above, small portable fans do not have blades aerodynamically optimized for airflow.

In addition, portable fans have batteries that have limited lifespans since the batteries either need to be constantly recharged from a 120 volt power supply or the batteries need to be constantly replaced.

The need for efficient powered portable fans has been growing much more in recent years. Natural disasters such as hurricanes and earthquakes have caused extensive power outages that can last from several hours to weeks or more in the United States. Conventional battery powered fans, cannot be used effectively during these disaster conditions. The prior art listed above does not fix the problems with portable fan use.

Thus, the need exists for better performing fans over the prior art.

SUMMARY OF THE INVENTION

The first objective of the subject invention is to provide efficient roof/attic exhaust fans, blades, devices, apparatus and methods of operating the fans, that have optimized twisted nonmetal blades for maximizing removal of air from spaces underneath roofs.

The second objective of the subject invention is to provide efficient roof/attic exhaust fans, blades, devices, apparatus and methods of operating the fans, that can be solar powered.

The third objective of the subject invention is to provide efficient roof/attic exhaust fans, blades, devices, apparatus and methods of operating the fans, that can generate air flow up to at least approximately 30% above existing ventilation fans.

The fourth objective of the subject invention is to provide efficient roof/attic exhaust fans, blades, devices, apparatus and methods of operating the fans, that moves more air than existing ventilation fans and requires less power than existing ventilation fans. The invention reduces electrical power consumption and is more energy efficient over traditional flat planar ceiling fan blades.

The fifth objective of the subject invention is to provide efficient roof/attic exhaust fans, blades, devices, apparatus and methods of operating the fans, having fan blade aerodynamics optimized to maximize airflow in an approximately 15 inch diameter fan operating at up to approximately 500 (revolutions per minute) RPM.

The sixth objective of the subject invention is to provide efficient roof/attic exhaust fans, blades, devices, apparatus and methods of operating the fans, where the blades and hub are a single molded piece of plastic.

The seventh objective of the subject invention is to provide portable fans that can be used anywhere, and blades, devices, apparatus and methods of operating the fans, having optimized twisted nonmetal blades for maximizing air ventilation.

The eighth objective of the subject invention is to provide portable fans that can be used anywhere, and blades, devices, apparatus and methods of operating the fans, that can be solar powered.

The ninth objective of the subject invention is to provide portable fans that can be used anywhere, and blades, devices, apparatus and methods of operating the fans, that can generate air flow up to at least approximately 30% above existing portable fans.

The tenth objective of the subject invention is to provide portable fans that can be used anywhere, and blades, devices, apparatus and methods of operating the fans, that move more air than existing ventilation fans and require less power than existing ventilation fans. The invention reduces electrical power consumption and is more energy efficient over traditional flat planar ceiling fan blades.

The eleventh objective of the subject invention is to provide portable fans that can be used anywhere, and blades, devices, apparatus and methods of operating the fans, having fan blade aerodynamics optimized to maximize airflow in an approximately 15 inch diameter fan operating at up to approximately 500 (revolutions per minute) RPM.

The twelfth objective of the subject invention is to provide portable fans, blades, devices, apparatus and methods of operating the fans, that can be used anywhere such as during and after natural disasters such as hurricanes, earthquakes, and the like, as well as in environments having limited power supplies such as in construction sites, at picnics and other outings, on camping, hiking and fishing trips and at the beach.

The thirteenth objective of the invention is to provide methods, systems and devices that allow a single person to easily carry and transport both a fan assembly and a solar powered panel assembly.

The fourteenth objective of the invention is to provide methods, systems and devices for allowing for a rechargeable backup power pack to be used with a solar powered fan system when solar power is not available.

The fifteenth objective of the invention is to provide methods, systems and devices for allowing for a power pack for running a portable fan to be recharged used using solar power source.

The sixteenth objective of the invention is to provide a carrying case similar to a brief case for holding a solar panel(s) that allows the panel(s) to be easily carried in a single hand when folded, and allows for supporting the panel(s) at selected angles when a leg(s) is deployed.

A preferred embodiment can include a plurality of efficient optimized small diameter fan blades with a hub. Diameter sizes of the fans can include but not be limited to less than and up to approximately 15", and greater. The blades can be made from plastic, and the like, and be pre-molded together with the hub. The blade dimensions and twist angles can be optimized to move air when running at approximately 500 rpm (revolutions per minute).

The solar powered fans can be used in attics and under roofs to ventilate and/or exhaust heated air therefrom.

Another embodiment has the solar powered fan being portable so that it can be used most anywhere there is a need for moving and circulating air. The fan can be moveable by a wheeled stand, and the solar powered panels can be movable by a hand truck, and the like.

A still another embodiment allows for a battery powered fan assembly to be easily carried in one hand while a folded solar panel assembly can be easily carried in another hand, where the fan and solar panel assemblies are portable and easily deployed. The folded solar panel can be mounted in a rectangular type case such as a briefcase where the user can easily transport the panel by a single handle on the case.

Further objects and advantages of this invention will be apparent from the following detailed descriptions of the presently preferred embodiments which are illustrated schematically in the accompanying drawings.

BRIEF DESCRIPTION OF THE FIGURES

FIG. 2A is an upper top perspective view of a single twisted blade of FIGS. 1A-1C.

FIG. 2B is a top view of the single twisted blade of FIG. 2A.

FIG. 2E is a lower bottom perspective view of the twisted blade of FIG. 2A.

FIG. 2F is a bottom view of the twisted blade of FIG. 2E.

FIG. 3 is a side perspective view of the twisted blade of FIG. 2B along arrow 3x with labeled cross-sections A, B, C, D, E.

FIG. 4 is an end view of FIG. 3 showing the different cross-sections A, B, C, D, and E.

FIG. 16 shows a left side view of the DC fan of FIG. 12.

FIG. 22 is a front perspective view of the portable solar panel assembly folded for transport.
FIG. 23 is a rear perspective view of the portable solar panel assembly folded for transport.
FIG. 31 is a front view of the deployed solar panel assembly.

DESCRIPTION OF THE PREFERRED EMBODIMENT

Figure 1B:
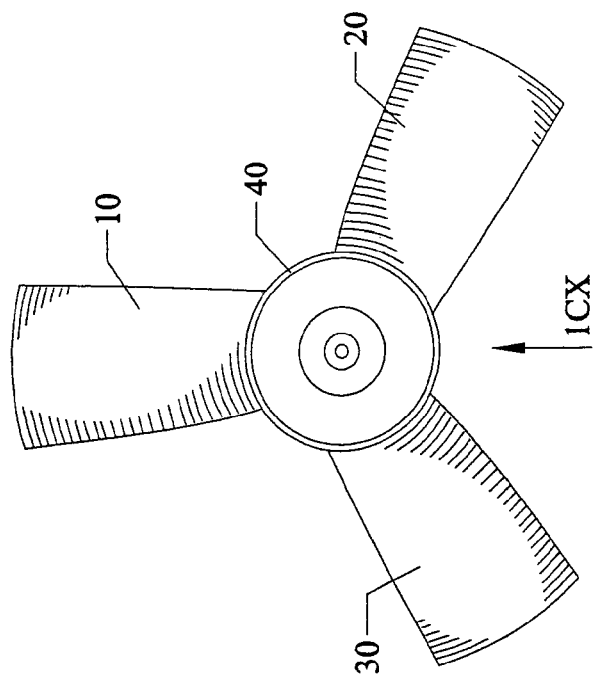
FIG. 1B is a bottom view of the blades with hub of FIG. 1A.

Before explaining the disclosed embodiments of the present invention in detail it is to be understood that the invention is not limited in its application to the details of the particular arrangement shown since the invention is capable of other embodiments. Also, the terminology used herein is for the purpose of description and not of limitation. The labeled components will now be described.
1 hub and blade assembly
10 First blade
20 Second blade
30 Third blade
40 Hub
50 Motor
55 Power line
12 Root end of blade
18 Tip end of blade
14LE leading edge of blade
16TE trailing edge of blade
15 upper surface of blade
17 lower surface of blade
100 Solar power source
110, 120 PV (photovoltaic panels)
130 Solar panel frame
140 Optional stand
150 Optional Additional panels, frame and stand
200 Roof Alcove Exhaust
210 Roof
215 Opening in roof
220 Gable wall
225 Opening in gable wall
230 Hood
235 Louvers
240 housing
300 Roof Top Exhaust
330 Domed hood cover
335 Lower Opening about overhanging edges of Dome Cover
340 Housing under roof
350 Cylindrical Housing outside of roof
400 Portable Fan
410 Cylinder cover
420 pole
430 triangular base
440 wheels
450 Stand handle
460 fan speed control
470 Solar panels
475 cable/power line
480 handtruck
490 battery power source
495 cable/powerline
500 Portable fan and solar panel case assembly
510 Battery powered fan assembly.
520 Portable solar panel assembly.
530 Rechargeable battery pack.
532 downwardly projecting plug
540 DC power supply/battery recharge.
545 power cable
550 DC power switch.
560 Fan
562 handle
565 motor
568 U shaped floor stand with upwardly bent ends
569 rubber footers
570 Solar panel.
572, 578 outer side walls
574 rear support bar
575 rear box
580 Solar panel cover.
582, 588 angled side edges
585 an open end portion
590 Solar panel support stand.
591, 599 hinged tabs
592, 598 inwardly angled ends
594, 596 side legs
595 bottom leg
600 Solar panel carry handle.
610 Fan speed switch.
620A, 620B Wall receptacle charge cable(s).
630A, 630B Solar charge cable(s).
640 Solar charge connector.
650 Wall receptacle charge connector.
660 Wall plug/transformer.
670 A.C. powered batter charger (remote).
675 receptacle
680 A.C. wall plug.
690 Solar panel cover hinge pin.

Figure 1C:
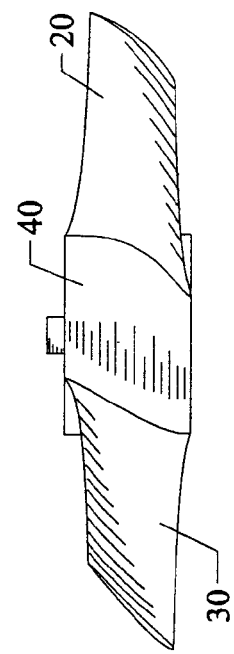
FIG. 1C is a side view of the blades and hub of FIG. 1B along arrow 1CX.
Figure 1A:
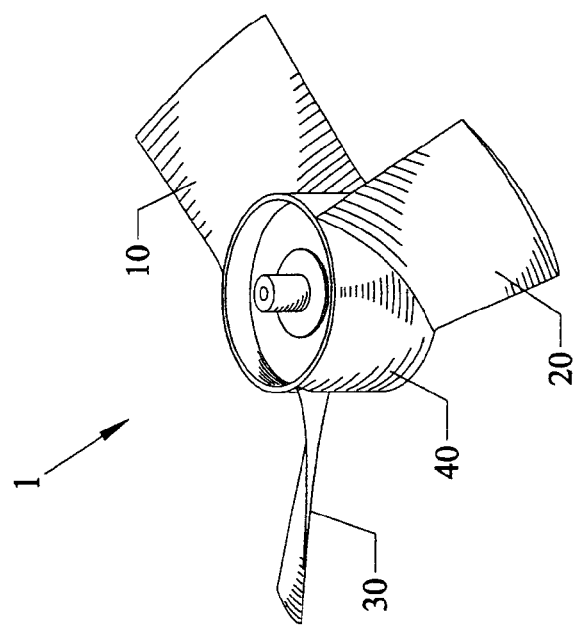
FIG. 1A is a perspective view of the novel three twisted blades with hub that can be used with an attic fan.

FIG. 1A is a perspective view 1 of the novel three twisted blades 10, 20, 30 with hub 40 that can be used with an attic fan. FIG. 1B is a bottom view of the blades 10-30 with hub 40 of FIG. 1A. FIG. 1C is a side view of the blades 10-30 and hub 40 of FIG. 1B along arrow 1CX.

Figure 2C:
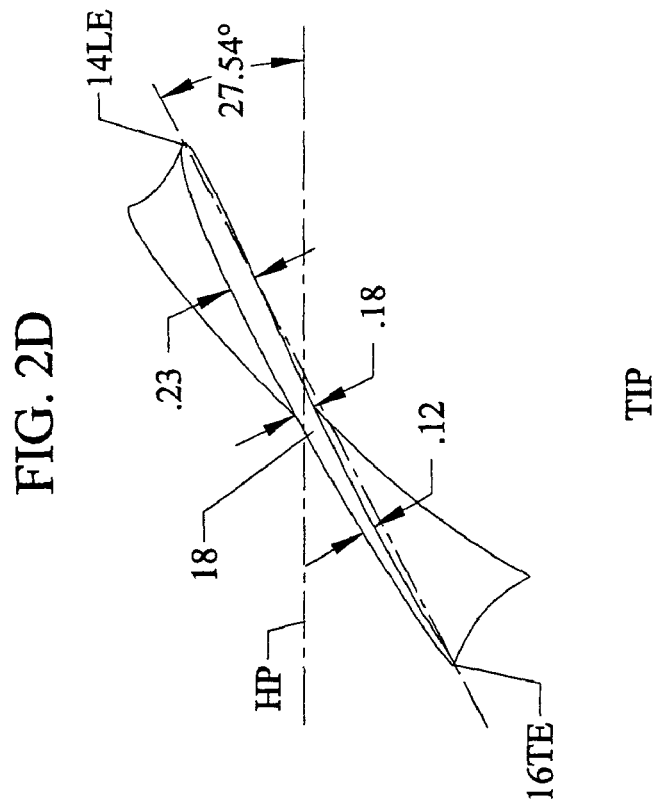
FIG. 2C is a root end view of the single twisted blade of FIG. 2B along arrow 2C.
Figure 2D:
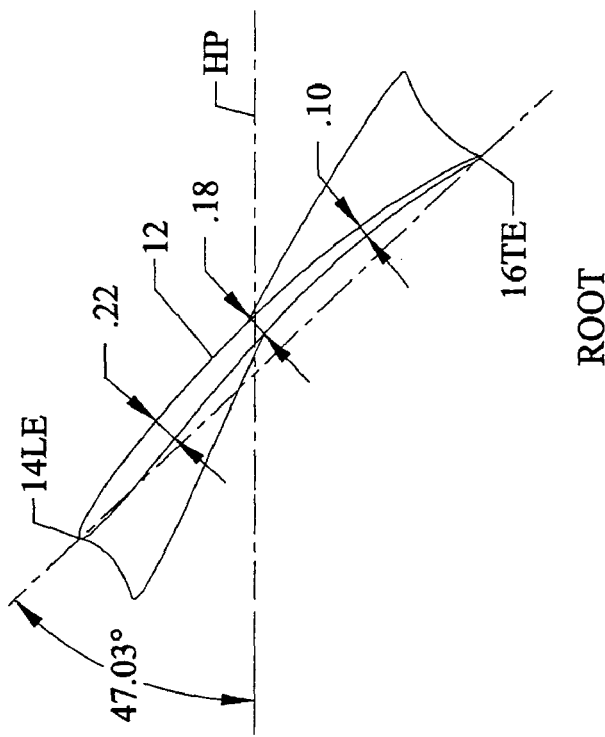
FIG. 2D is a tip end view of the single twisted blade of FIG. 2B along arrow 2D.

FIG. 2A is an upper top perspective view of a single twisted blade 10 of FIGS. 1A-1C. FIG. 2B is a top view of the single twisted blade 10 of FIG. 2A. FIG. 2C is a root end view of the single twisted blade 10 of FIG. 2B along arrow 2C. FIG. 2D is a tip end view of the single twisted blade 10 of FIG. 2B along arrow 2D. FIG. 2E is a lower bottom perspective view of the twisted blade 10 of FIG. 2A. FIG. 2F is a bottom view of the twisted blade 10 of FIG. 2E.

Referring to FIGS. 1-2F, the novel fan can have three twisted blades 10, 20, 30 each having a positive twist between their root ends adjacent to the hub 40 and their tip ends. The overall diameter of the fan 1 can be approximately 15 inches across the blade tip ends. The blades 10, 20, 30 and hub 40 can be formed into a single molded unit, such as being formed from injection molded plastic, and the like.

Referring to FIGS. 2B-2D, the single twisted blade 10 can have a length of approximately 5.23 inches between the root end 12 and the tip end 18. The twisted blade 10 can be attached to the hub 40 of FIGS. 1A-1C with the leading edge 14LE of the root end 12 having an raised angle of approximately 47.03 degrees above horizontal plane HP with the trailing edge 16TE of the root end 12 being below the horizontal plane HP. The tip end 18 of the blade 10 can have a twist from the root end so that the leading edge 14LE is approximately 27.54 degrees above the horizontal plane HP with the trailing edge 16TE below the horizontal plane HP.

FIG. 3 is a side perspective view of the blade of FIG. 2B along arrow 3X with labeled cross-sections A, B, C, D, E in between the root end 12 and tip end 18. FIG. 4 is an end view of FIG. 3 showing the different cross-sections A, B, C, D, and E, in curved views superimposed over one another showing the varying degrees of twist between the root end and tip end of the blade 10.

Figure 5A:
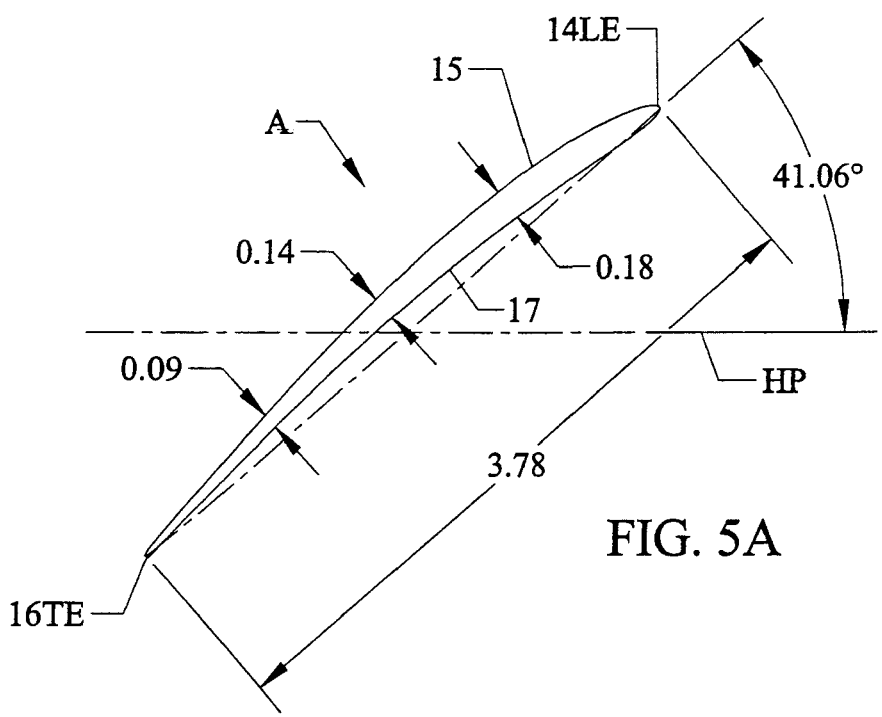
FIG. 5A shows the cross-section A of FIGS. 3-4.

FIG. 5A shows the cross-section A of FIGS. 3-4 having a leading edge 14LE slightly curved down being approximately 41.06 degrees above the horizontal plane HP. Cross-section A has a convex shaped upper surface 15 and a lower surface 17 with a concave bend configuration, and trailing edge 16TE below the horizontal plane HP. The leading edge 14LE having a more blunt rounded edge than the trailing edge 16TE. Cross-section A can have a width of approximately 3.78 inches between the trailing edge 16TE and leading edge 14LE. The thickness of the cross-section A can expand from the trailing edge 16TE to being approximately 0.09 inches half way to a midpoint of the cross-section which has a thickness of approximately 0.14 inches, and the thickness halfway between the midpoint and the leading edge 14LE being approximately 0.18 inches.

Figure 5B:
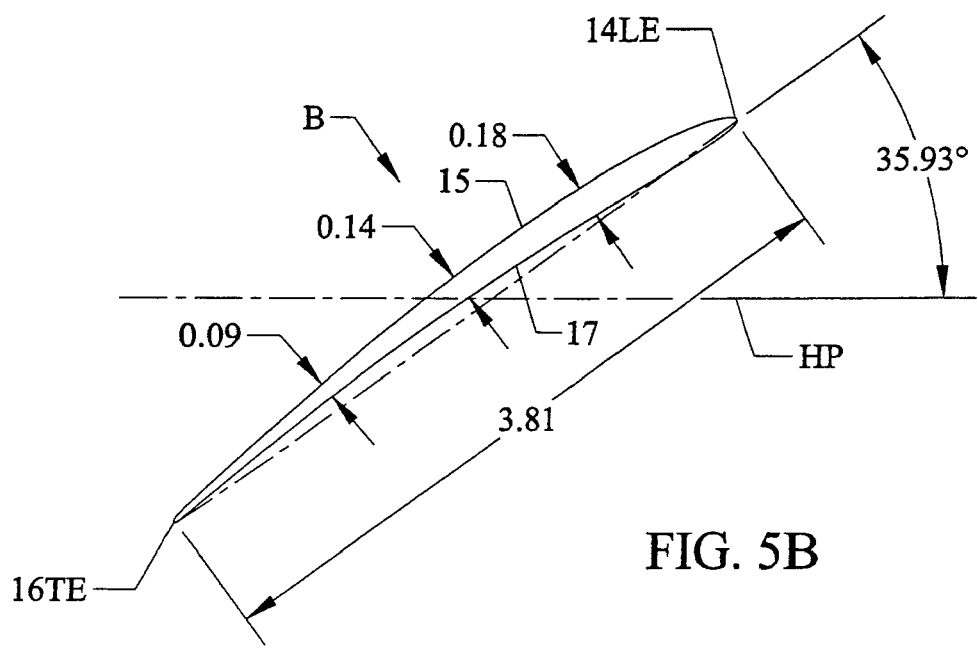
FIG. 5B shows the cross-section B of FIGS. 3-4.

FIG. 5B shows the cross-section B of FIGS. 3-4 having a leading edge 14LE slightly curved down being approximately 35.93 degrees above the horizontal plane HP. Cross-section B has a convex shaped upper surface 15 and a lower surface 17 with a concave bend configuration, and trailing edge 16TE below the horizontal plane HP. The leading edge 14LE having a more blunt rounded edge than the trailing edge 16TE. Cross-section B can have a width of approximately 3.81 inches between the trailing edge 16TE and leading edge 14LE. The thickness of the cross-section B can expand from the trailing edge 16TE to being approximately 0.09 inches half way to a midpoint of the cross-section which has a thickness of approximately 0.14 inches, and the thickness halfway between the midpoint and the leading edge 14LE being approximately 0.18 inches.

Figure 5C:
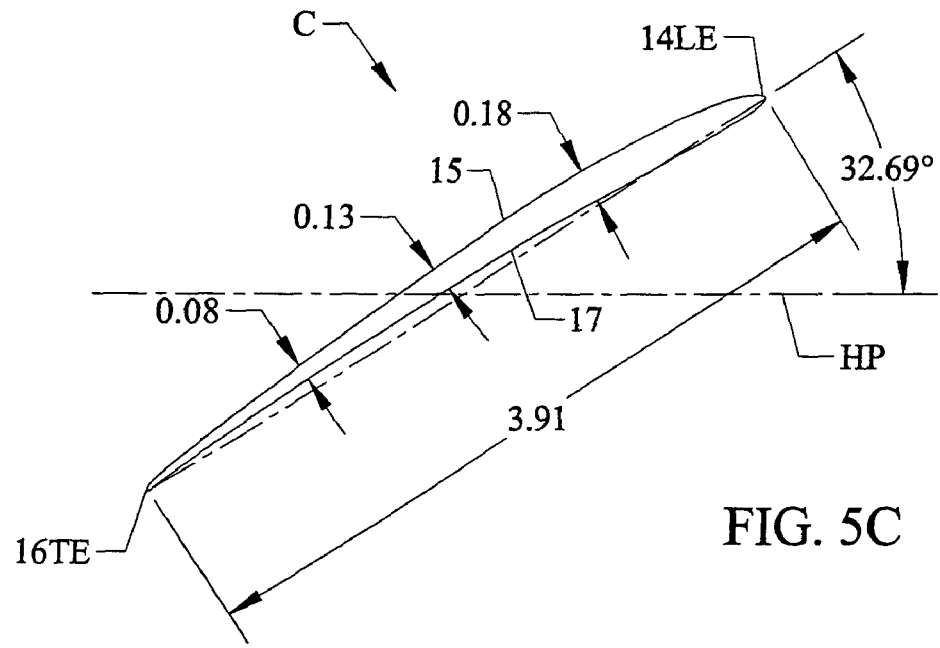
FIG. 5C shows the cross-section C of FIGS. 3-4.

FIG. 5C shows the cross-section C of FIGS. 3-4 having a leading edge 14LE slightly curved down being approximately 32.69 degrees above the horizontal plane HP. Cross-section C has a convex shaped upper surface 15 and a lower surface 17 with a concave bend configuration, and trailing edge 16TE below the horizontal plane HP. The leading edge 14LE having a more blunt rounded edge than the trailing edge 16TE. Cross-section C can have a width of approximately 3.91 inches between the trailing edge 16TE and leading edge 14LE. The thickness of the cross-section C can expand from the trailing edge 16TE to being approximately 0.08 inches half way to a midpoint of the cross-section which has a thickness of approximately 0.13 inches, and the thickness halfway between the midpoint and the leading edge 14LE being approximately 0.18 inches.

Figure 5D:
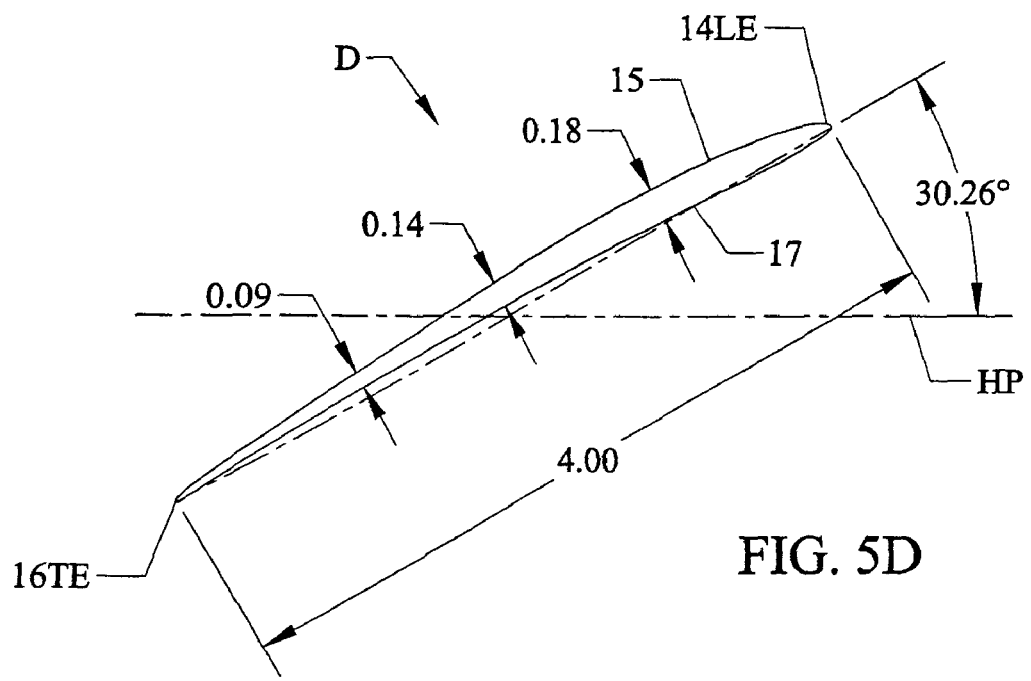
FIG. 5D shows the cross-section D of FIGS. 3-4.

FIG. 5D shows the cross-section D of FIGS. 3-4 having a leading edge 14LE slightly curved down being approximately 30.26 degrees above the horizontal plane HP. Cross-section D has a convex shaped upper surface 15 and a lower surface 17 with a concave bend configuration, and trailing edge 16TE below the horizontal plane HP. The leading edge 14LE having a more blunt rounded edge than the trailing edge 16TE. Cross-section D can have a width of approximately 4.0 inches between the trailing edge 16TE and leading edge 14LE. The thickness of the cross-section D can expand from the trailing edge 16TE to being approximately 0.09 inches half way to a midpoint of the cross-section which has a thickness of approximately 0.14 inches, and the thickness halfway between the midpoint and the leading edge 14LE being approximately 0.18 inches.

Figure 5E:
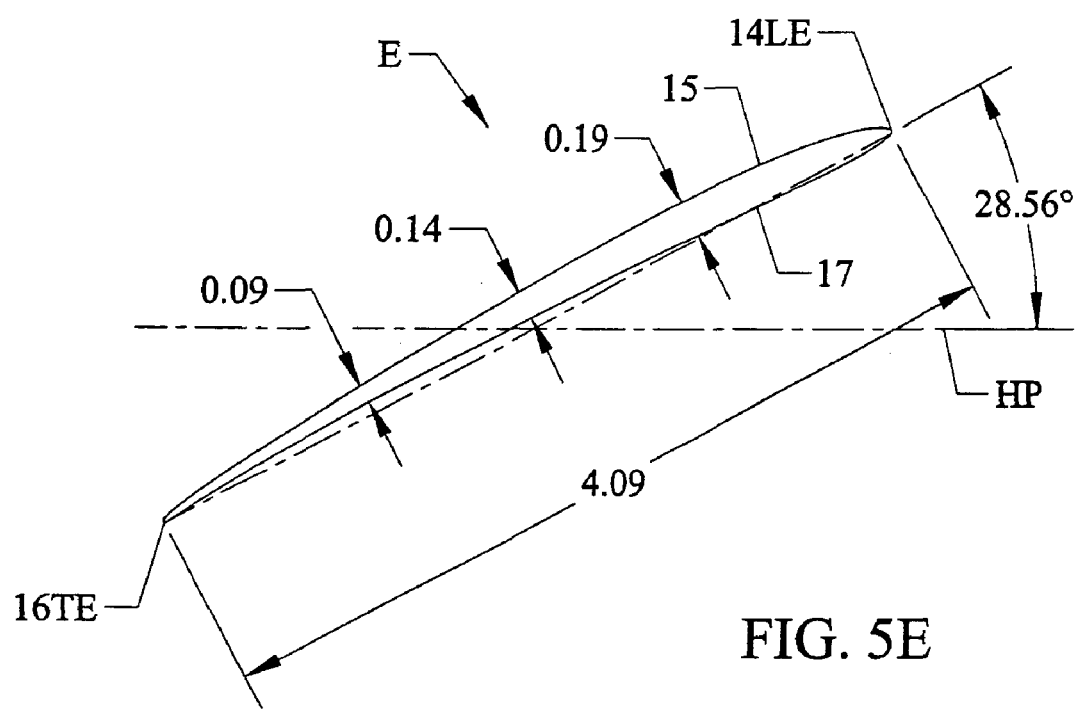
FIG. 5E shows the cross-section E of FIGS. 3-4.

FIG. 5E shows the cross-section E of FIGS. 3-4 having a leading edge 14LE slightly curved down being approximately 28.56 degrees above the horizontal plane HP. Cross-section E has a convex shaped upper surface 15 and a lower surface 17 with a concave bend configuration, and trailing edge 16TE below the horizontal plane HP. The leading edge 14LE having a more blunt rounded edge than the trailing edge 16TE. Cross-section E can have a width of approximately 4.09 inches between the trailing edge 16TE and leading edge 14LE. The thickness of the cross-section E can expand from the trailing edge 16TE to being approximately 0.09 inches half way to a midpoint of the cross-section which has a thickness of approximately 0.14 inches, and the thickness halfway between the midpoint and the leading edge 14LE being approximately 0.19 inches.

Roof Alcove Exhaust

Figure 6:
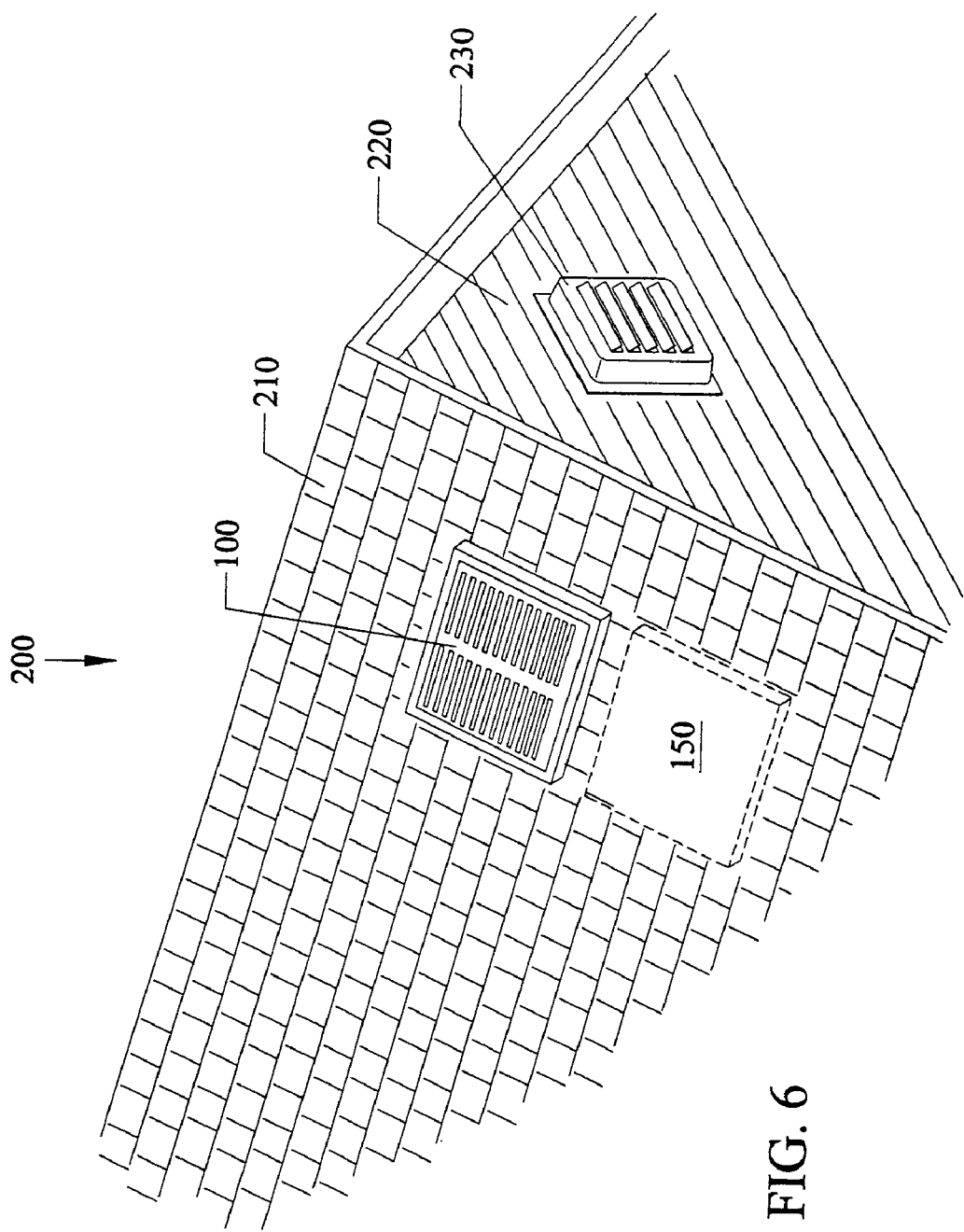
FIG. 6 is a perspective exterior view of a roof alcove exhaust incorporating the fan and blades of the preceding figures with a solar power source.
Figure 7:
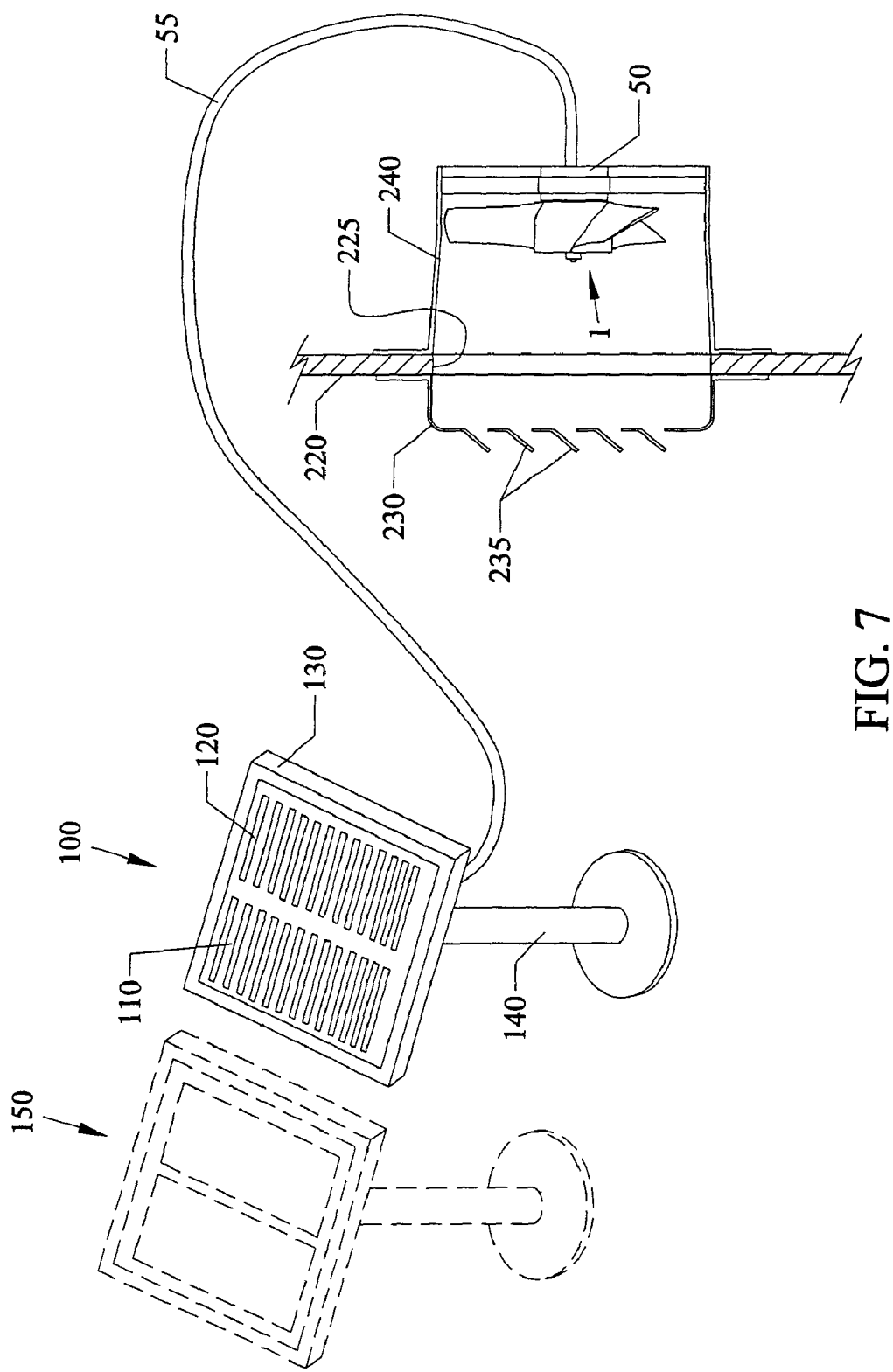
FIG. 7 is a view of the separate components of FIG. 6.

FIG. 6 is a perspective exterior view of a roof alcove exhaust embodiment 200 incorporating the fan 1 and blades 10, 20, 30 of the preceding figures with a solar power source 100. FIG. 7 is a view of the separate components of FIG. 6.

Referring to FIGS. 6-7, the novel fan 1 can be mounted with blades 10-30 facing to exhaust sideways in a housing 240 inside of an opening 225 in a gable side wall 220 below a roof 210. The outer hood 230 with louvers 235 can cover the opening 225 in the gable side wall 220. The fan motor 50 can draw power through cable/power line 55 from a rooftop mounted solar power source 100, which can include two PV (photovoltaic) panels 110, 120 in a frame 130 that can be directly attached (by screws, and the like) into the roof 210. An optional stand 140 can be used to elevate the solar panels 110, 120 and frame 130 above the roof 210. Additional power can be provided by another solar power source 150.

Roof Top Exhaust

Figure 8:
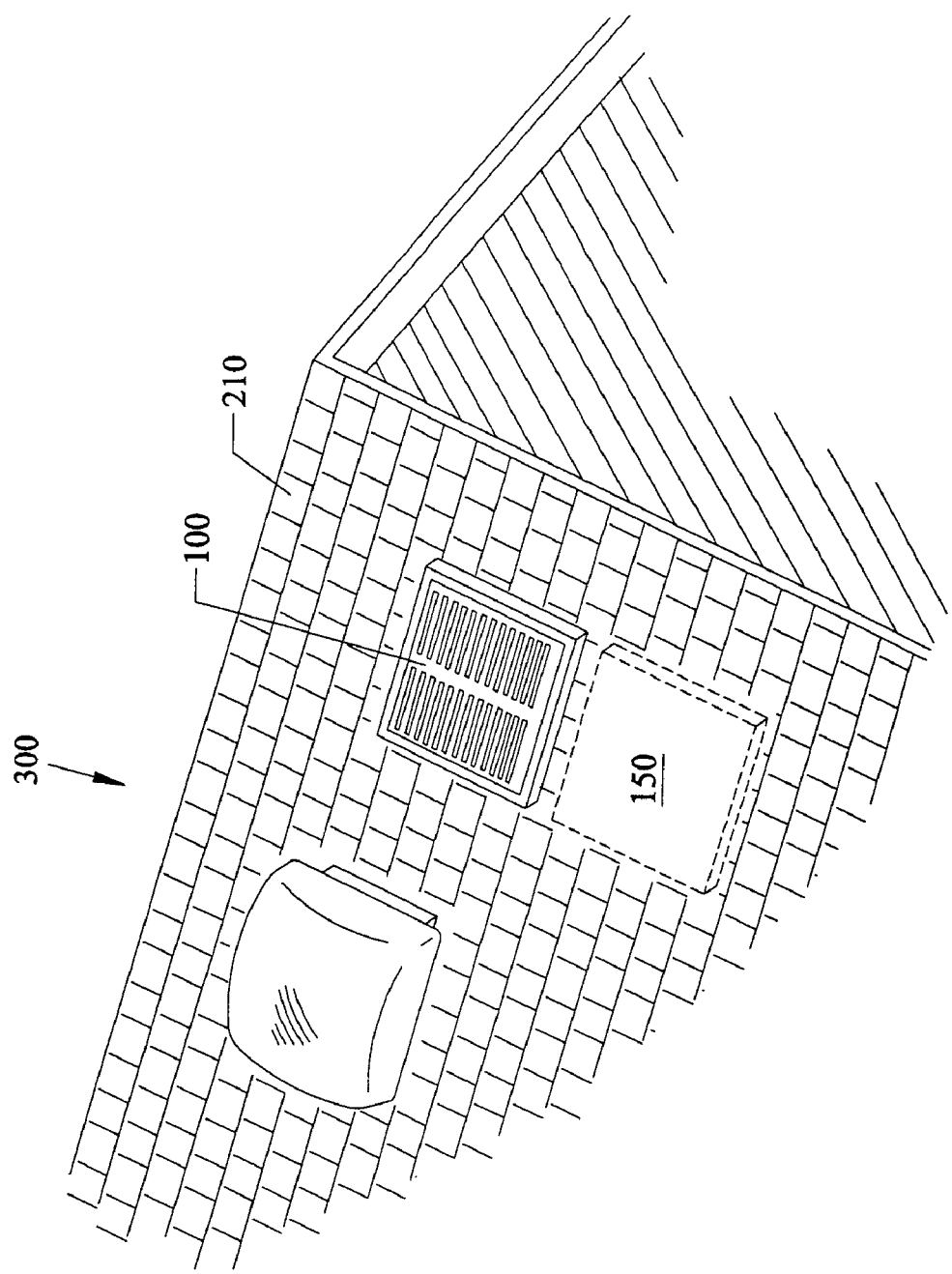
FIG. 8 is another perspective exterior view of a roof top exhaust incorporating the fan and blades of the preceding figures with a solar power source.
Figure 9:
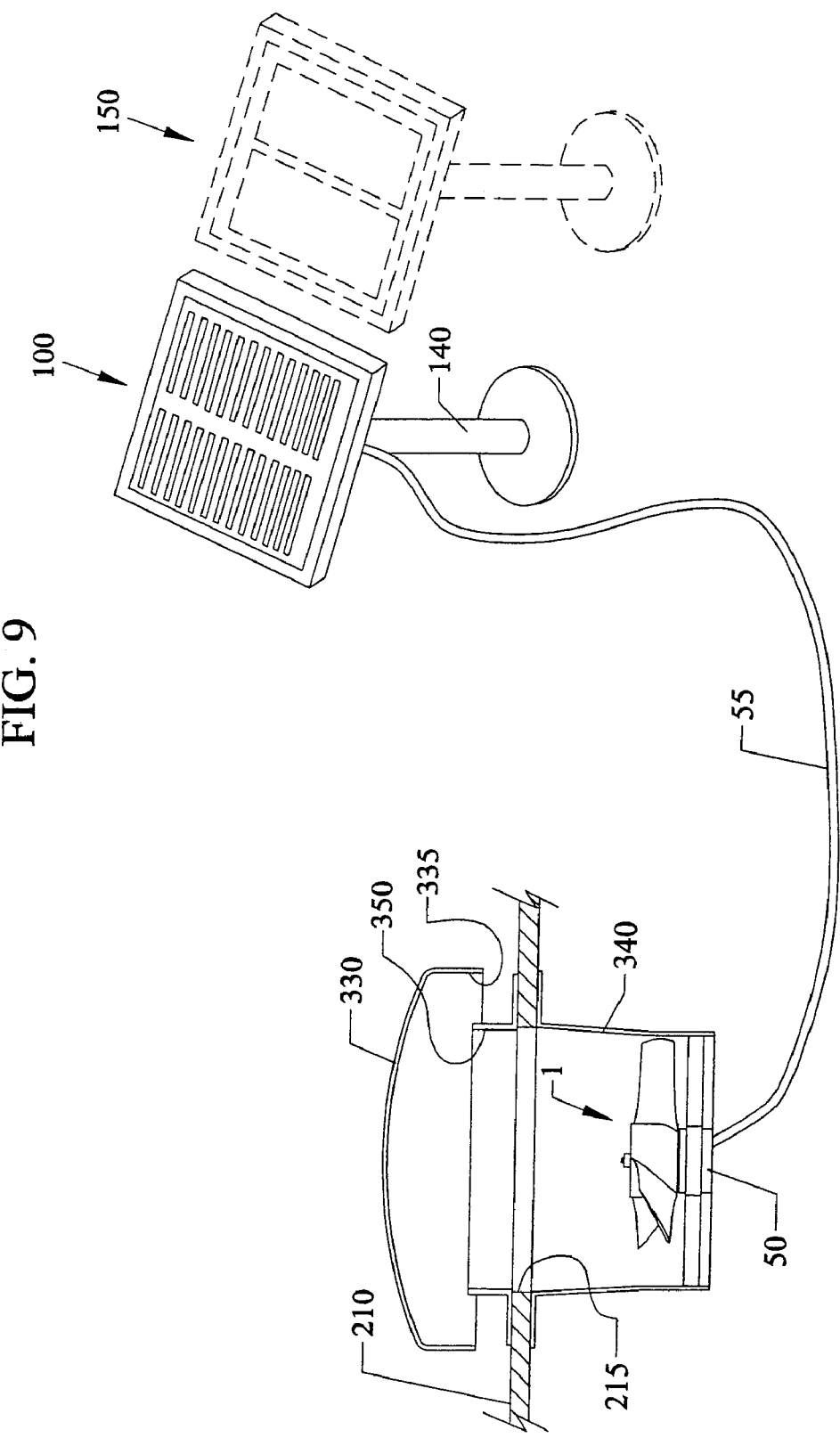
FIG. 9 is a view of the separate components of FIG. 8.

FIG. 8 is another perspective exterior view of a roof top exhaust 300 incorporating the fan 1 and blades 10, 20, 30 of the preceding figures with a solar power source 100. FIG. 9 is a view of the separate components of FIG. 8.

Referring to FIGS. 8-9, the novel fan 1 can be mounted with blades 10-30 facing to upward in a housing 340 underneath an opening 215 in roof 210. The domed hood cover 330 can overhang a cylindrical housing 350 outside roof 210 having side edges which overhang the housing 350 with an exhaust opening 335 thereunder. Similar to FIGS. 6-7, the fan motor 50 can draw power through cable/power line 55 from a rooftop mounted solar power source 100, which can include two PV (photovoltaic) panels 110, 120 in a frame 130 that can be directly attached (by screws, and the like) into the roof 210. An optional stand 140 can be used to elevate the solar panels 110, 120 and frame 130 above the roof 210. Additional power can be provided by another solar source 150.

Testing of the solar powered fan will now be described. A single 10W panel with an open circuit voltage of approximately 14 to approximately 15 vdc (volts direct current) was connected to the fan 1 previously described having twisted blades 10, 20, 30.

A conventional fan was compared to the novel fan 1 of the invention with the results shown in Table 1. The conventional fan tested was a KING OF FANS® Solar Gable Ventilation Fan (22-607-690) using a Brushless DC motor: BOM-ZYW 92/22A-03). The conventional fan used a 15 inch metal blade operating at 7.3 vdc (Volts DC current) @835 mA (milliamps).

The novel improved fan and diffuser used novel twisted blades and a diffuser housing (described more fully below) and used the same DC motor as that of the conventional fan and operated at 7.6 vdc@ 915 mA.

The conventional fan got about 6.0 Watts of useful power (VmA) out of the standard solar powered panel while the novel fan 1 had approximately 7.0 Watts which would show a better match of load to IV curve for PV panel. The IV curve is the relationship of the current versus voltage characteristics of a photovoltaic cell, module, or array.

The test results simulated those likely seen with two PV (photovoltaic) panels under partly sunny conditions (approximately 11.2 Volts, approximately 1.4 amps).

Tests of the two attic fans were conducted and the results are shown in TABLE 1. One test was with standard metal blades and a cylindrical housing and the second test used the novel twisted blades 10, 20, 30 and a conical diffuser housing for pressure recovery.

The inventors tested both models as if they were being run by two PV panels wired parallel: 11.2 Volts DC with approximately 1.4 amp current (approximately 15.7 Watts). A calibrated flow plenum was used for the testing.

TABLE 1

| Fan Type | ConventionalAttic Fan(KING OF FANS ®-Fan) | GRANGER ® Fan | Novel Efficient Fan |
| --- | --- | --- | --- |
| Total CFM | 802 | 1320 | 1043 |
| Total Watts | 22.0 | 200 | 22.0 |
| Total CFM/Watts | 36.4 | 6.6 | 47.4 |

Table 1 further compared the GRAINGER® fan (another fan) as well. Unlike the conventional fan and the novel fan, the GRAINGER® fan used a standard AC shaded pole motor instead of being solar powered.

The standard conventional fan (KING OF FANS®) and housing was found to move approximately 802 cfm (cubic feet per minute) at approximately 0.0 external static pressure. The improved fan 1 with the conical diffuser housing moved approximately 1043 cfm at zero static pressure. The novel fan also operated at a lower RPM (revolutions per minute) and was observed to be more quiet than the conventional fan.

The test results represented an approximately 30% increase in flow at the same power. Given that shaft power is increasing between the square and the cube of the air mass flow, this presents about an approximately 90% increase in the work being accomplished.

The GRAINGER® catalogue shows that comparable AC attic vent fans provide about 1320 cfm @200 Watts of AC power. The GRAINGER® attic vent fan retails for about $50; but that doesn't include the cost for an electrician to wire them up. Assuming that the AC attic fans might be operating 10 hours per day, the solar fans would be saving about $6 a month compared to a conventional AC powered one.

The prototype diffuser used with the novel fan had the following dimensions: Narrow point in diffuser throat: 15.5 inches; Fan diameter: approximately 15 inches; Tip clearance: approximately 0.25 inches; Overall height of diffuser: approximately 13.75 inches (can shorten to about 12.75 inches with lip to inlet bell); Exhaust diameter: approximately 17.25 inches; and Inlet diameter: approximately 16.0 inches. The region in the diffuser where the fan sweeps (about 4 inches in height as indicated by the hub) should be the narrowest section (approximately 15.5 inches). Above that the diffuser smoothly increases in diameter to 17.25°inches. The diffuser has an optimal angle of divergence of 7-10 degrees.

In summary, the novel fan 1 can generate airflow of at least approximately 900 cfm (cubic feet per minute) from the rotating blades while running the fan with the twisted blades and the motor at an efficiency of at least approximately 60 CFM per watt. The blades can be rotated up to approximately 500 RPM while generating an airflow of at least approximately 1000 cfm and up to at least approximately 1040 cfm or more.

Portable Fans

Figure 10:
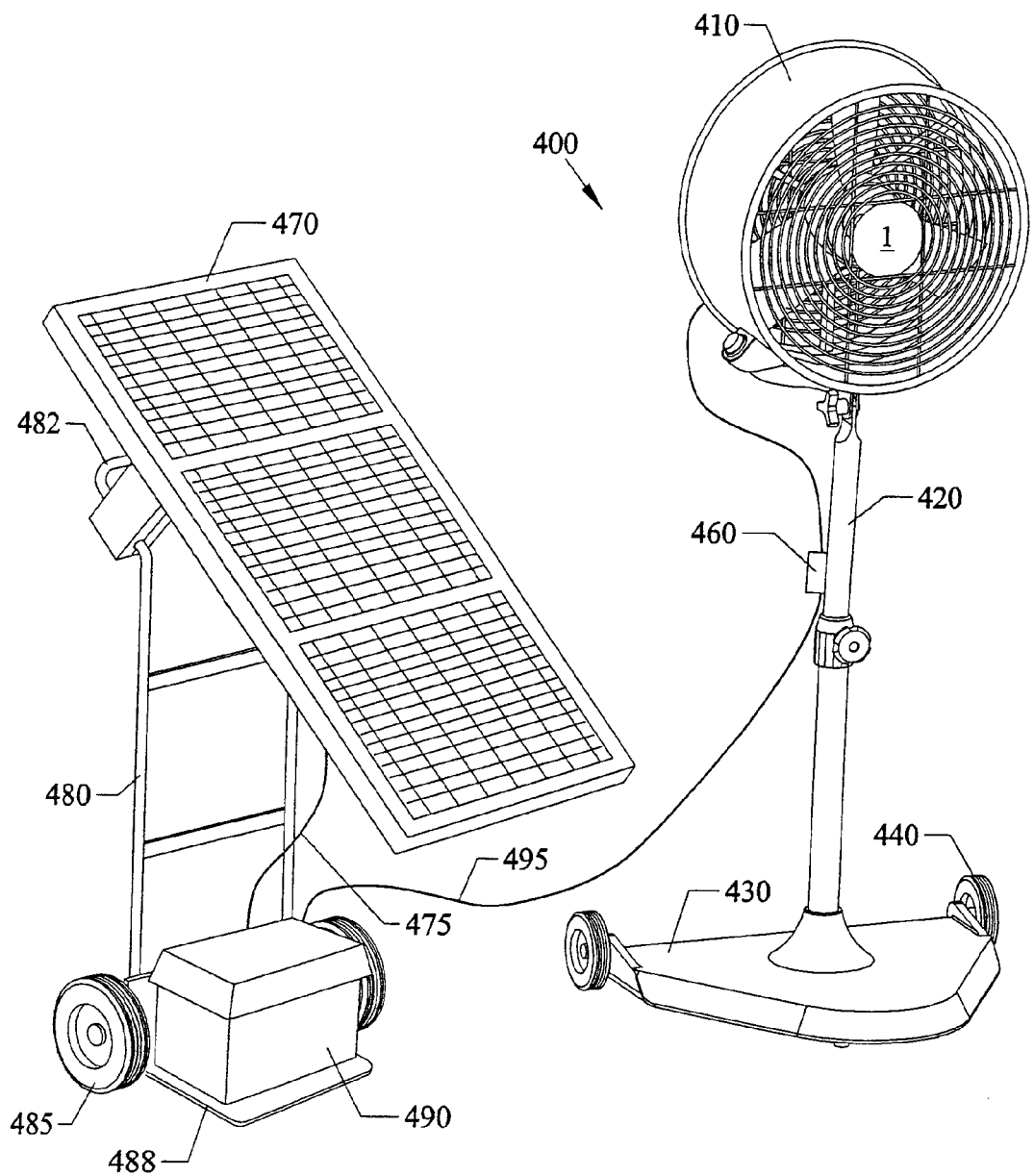
FIG. 10 is a perspective front view of a portable fan assembly incorporating the fan and blades of the preceding figures with a solar power source.
Figure 11:
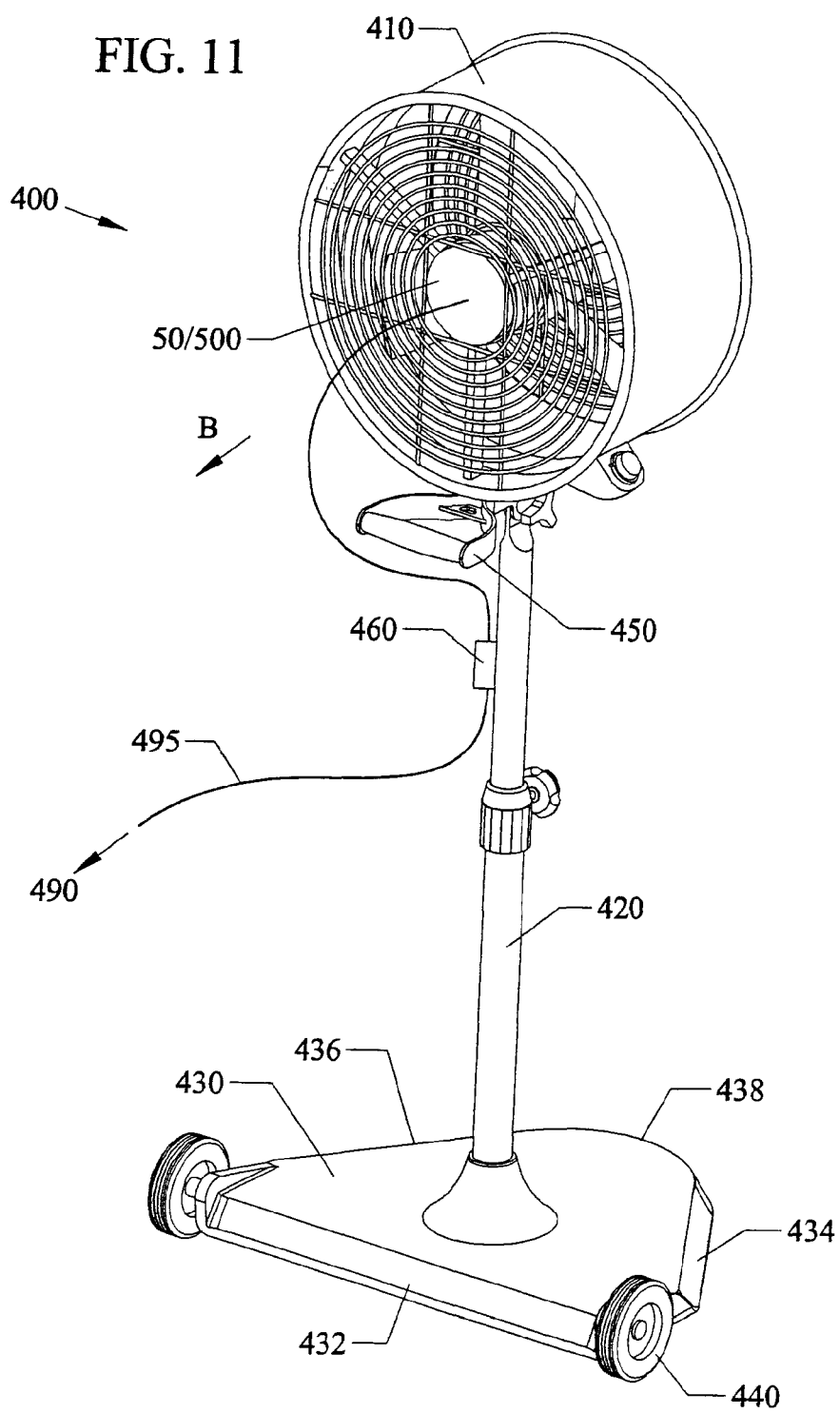
FIG. 11 is a rear view of the portable of FIG. 10.

FIG. 10 is a perspective front view of a portable fan 400 incorporating the fan 1 and blades 10, 20, 30 of the preceding figures with a solar power source 470. FIG. 11 is a rear view of the portable fan 400 of FIG. 10. The portable fan embodiment 400 combines a high efficiency fan 1 in a cylindrical housing 410 with a portable stand that can consist of a telescopingly height adjustable pole 420 with triangular shaped base 430 having wheels 440. The triangular shaped base 430 can have a rear generally straight edge 432 with wheels 440 mounted at each end, angled sides 434, 436 meeting at a rounded apex 438. The shape of the base 430 allows the fan 400 to be easily tilted back in the direction of arrow B so that a user can move the fan 400 with only two wheels 440 by gripping the handle 450 that is attached to the upper pole 420 of the portable fan 400.

A handtruck type stand 480 having an L-shape with wheels 485 on the lower end and hand rails 482 can support solar power panels (PV array) 470, with a battery 490 on the lower ledge 488. The battery power supply 490 can be connected by a power cable 475 to the photovoltaic (PV array) 470 where it becomes a PV powered charger that can be connected by another cable 495 to controls 460 to supply power to the fan 1 on the fan stand 420. The fan 400 can be moved for portable cooling anywhere outdoors where the cable line 495 can be extended up to approximately 50 feet or more in length from the PV powered charger. Similar to the preceding embodiments, the fan 1 and blades 10, 20, 30 can have optimized twist and airfoil as previously described to improve air moving performance.

The outdoor portable fan 400 can also use a high-efficiency brush-less DC motor 500 instead of the previously described motor 50 and can be hooked to a 30 Watt PV panel 470 charging two sealed lead acid 17.2 amp-hr gel cells in the battery 490. As previously described, a power cord 495 can allow the fan 400 to be located up to approximately 50 feet or more from the solar powered panels (PV) 470. Although the fan can be used outdoors, the cord 495 allows the fan 400 to be able to be used indoors with the PV panels located outdoors.

Fan speed of the DC motor 500 or the basic motor 50 can be modulated with a knob altered pulse width modulated (PWM) or resistance based control 460 to accordingly adjust speeds.

With the invention using the more efficient fan it is possible to move more air than conventional portable fans. It is possible to run the fan longer on a limited battery pack or to use smaller and less expensive PV panels with the invention.

The novel portable fan can be operated where no electric power is available, such as in remote locations or with disaster relief (post hurricane/post earthquake environments). The portable fan can have use in construction sites, at picnics and other outings, on camping, hiking and fishing trips and at the beach, and can be used both during the day and at night.

At full speed, the fan 400 can draw approximately 1.4 amps at approximately 11 volts (approximately 15 Watts). At half speed, the fan 400 can draw approximately 5 Watts. With its 34 amp per hour backup, the fan can operate for approximately 11 hours with an approximate 50% discharge with no sun. The fan 400 can use the plastic molded blades previously described and as a result can be more efficient than metal blades.

With an average of approximately 6 hours of sun per day, the portable fan 400 can potentially provide a continuous eight hours of daily operation at full speed, and a continuous 24 hours of operation at half speed.

Portable Fan Assemblies and Solar Power Panel Case Assemblies

Figure 12:
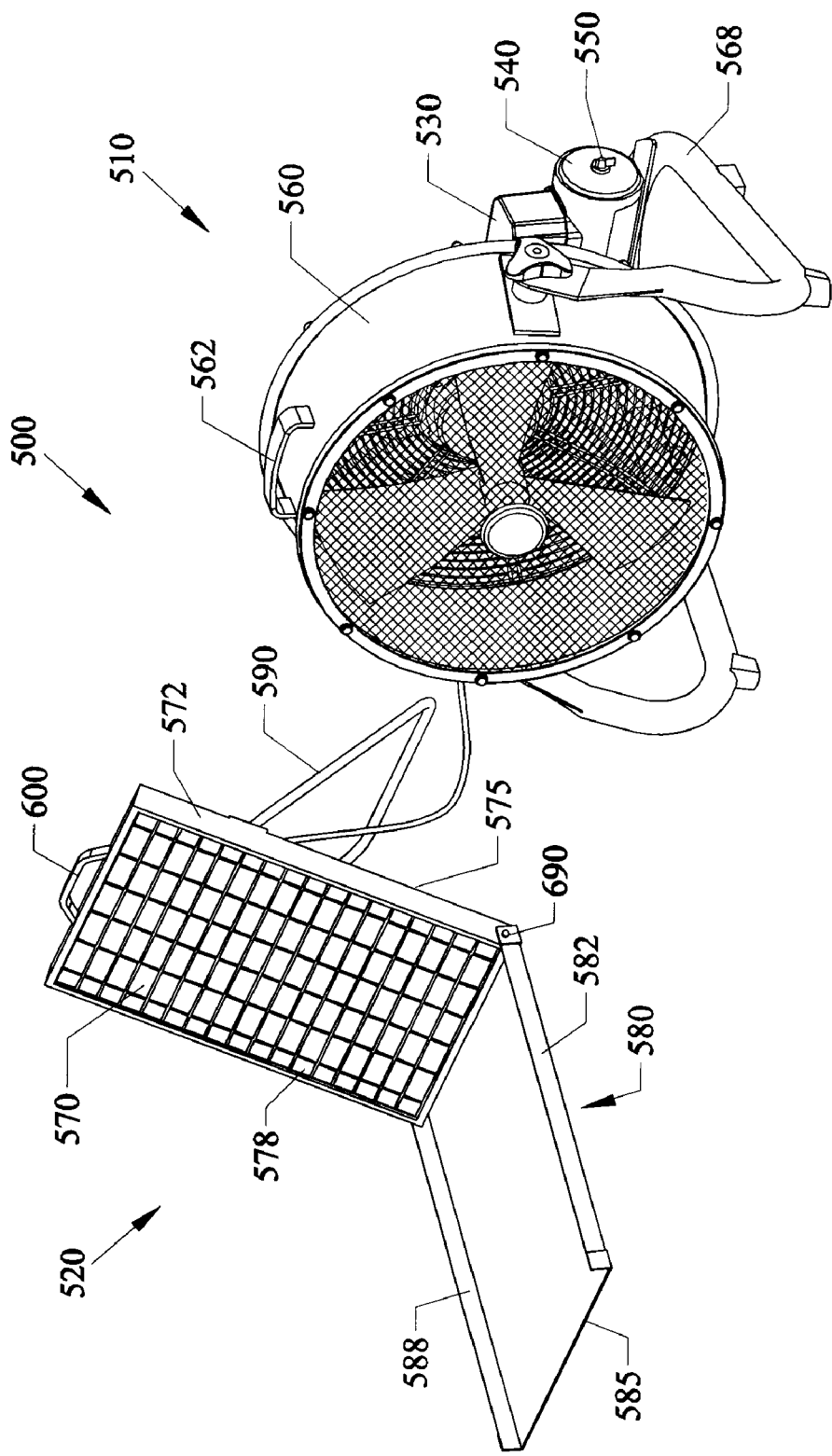
FIG. 12 is a front perspective view of DC powered fan assembly with portable solar panel assembly.
Figure 13:
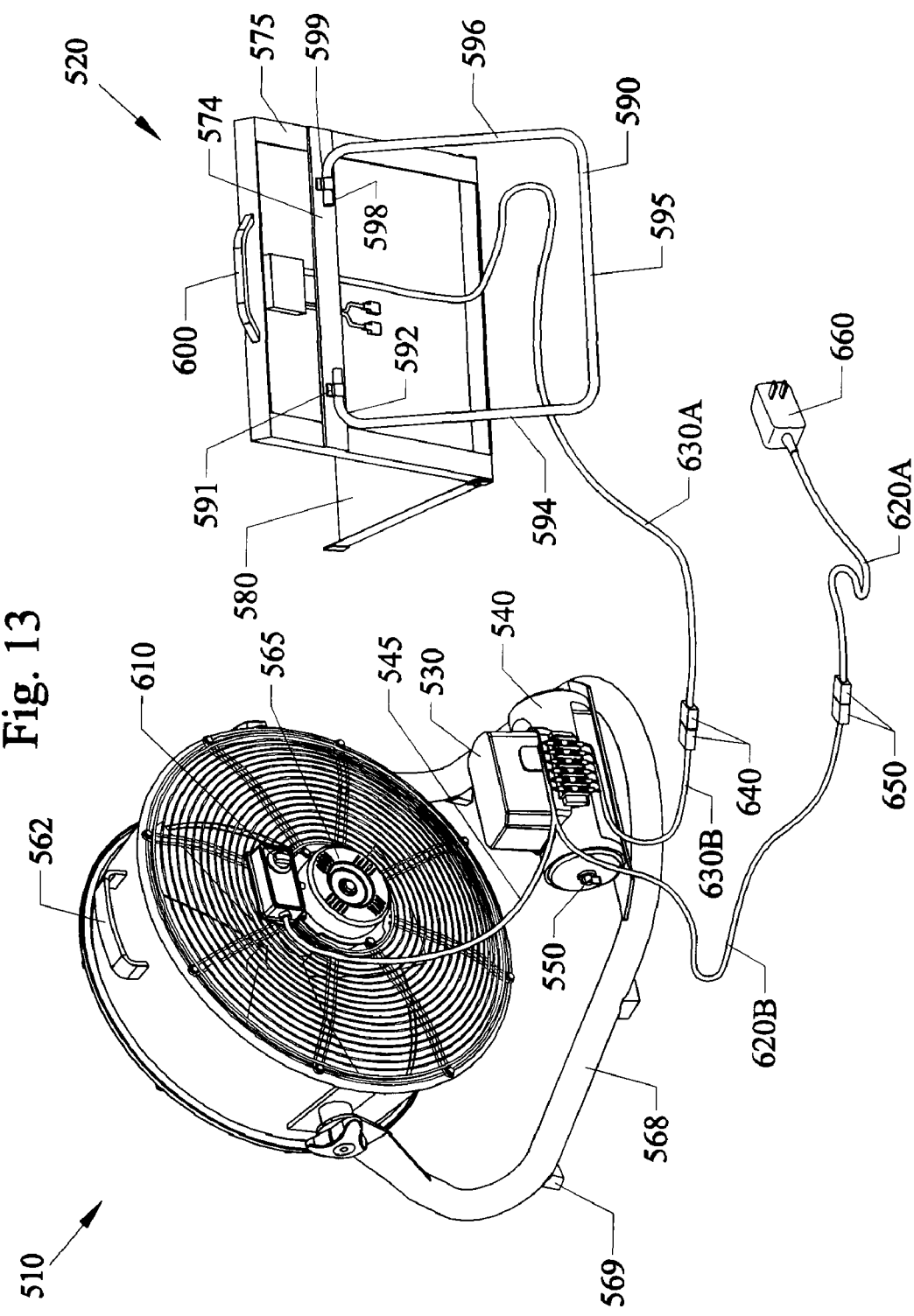
FIG. 13 is a rear perspective view of FIG. 12.
Figure 14:
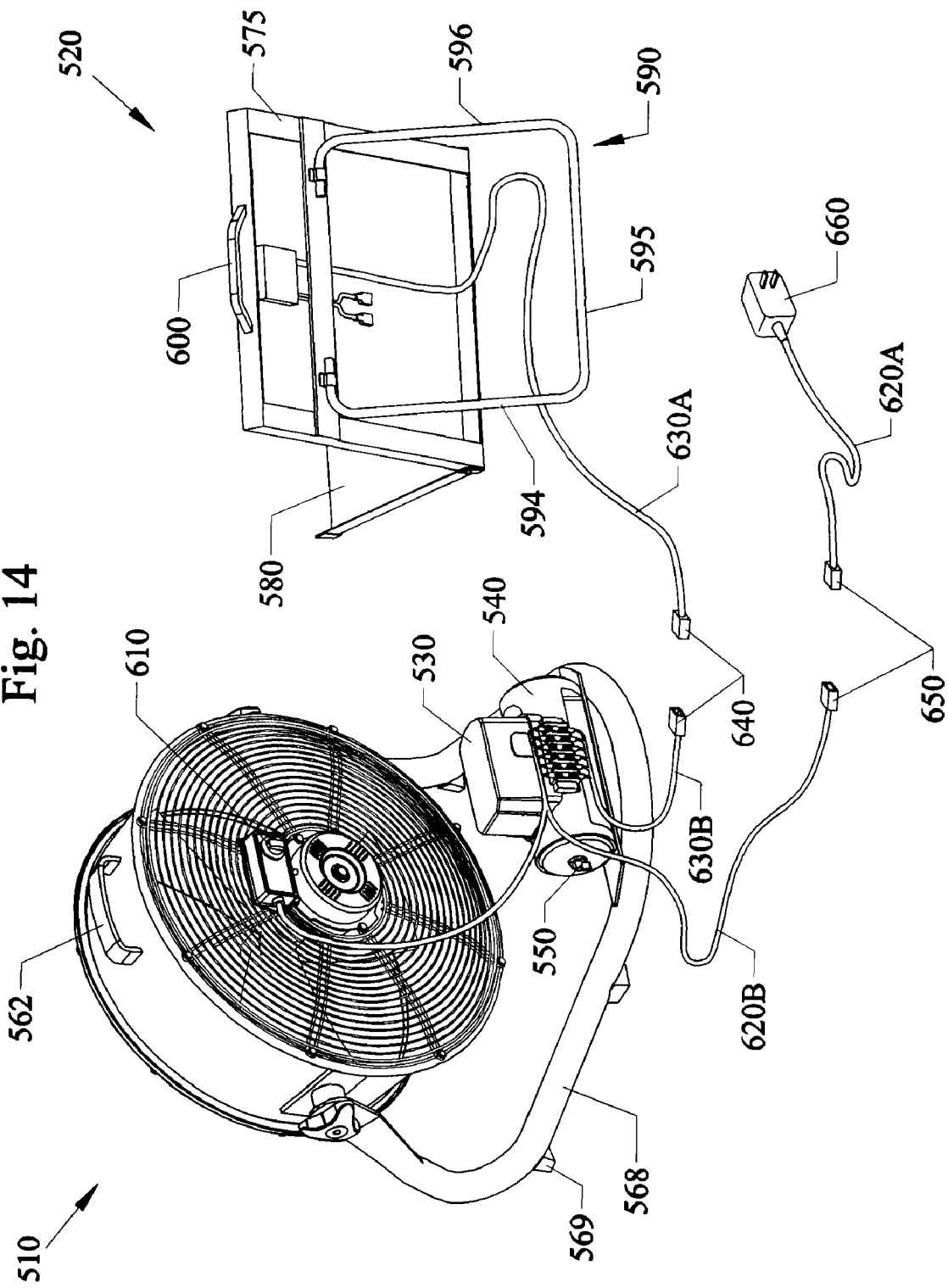
FIG. 14 is a rear perspective view showing charge cables disconnected.
Figure 15A:
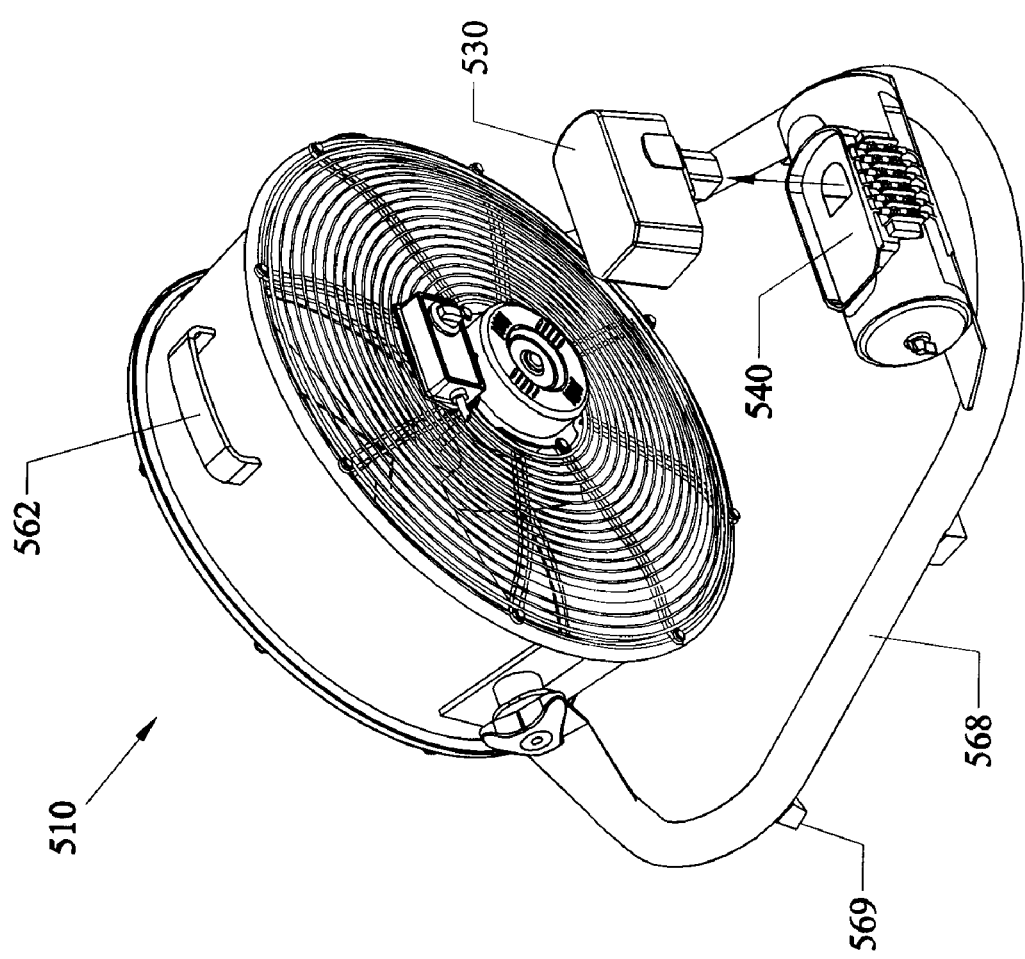
FIG. 15A is a rear perspective view showing remote battery charging.
Figure 15B:
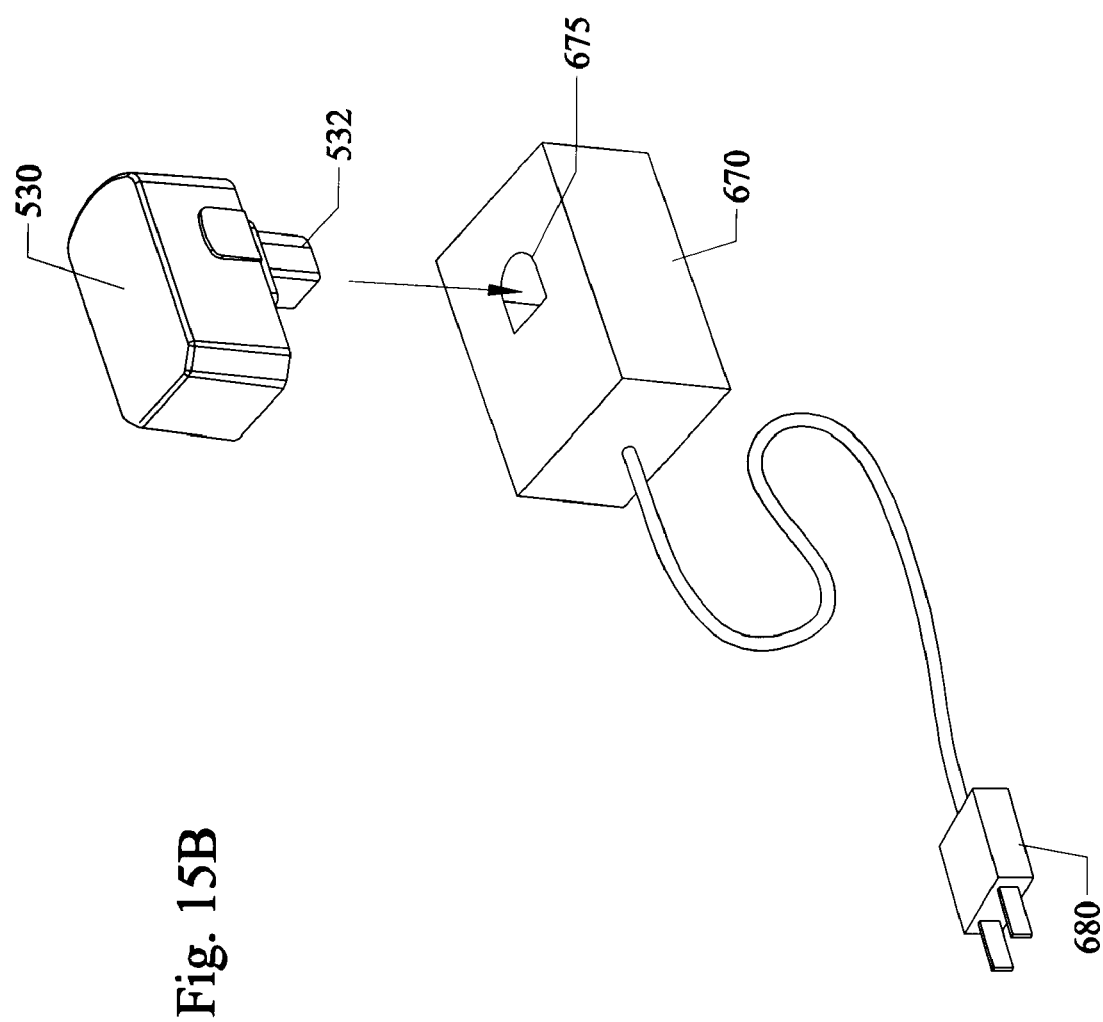
FIG. 15B shows the rechargeable battery pack and AC powered battery charger detached from one another.
Figure 15C:
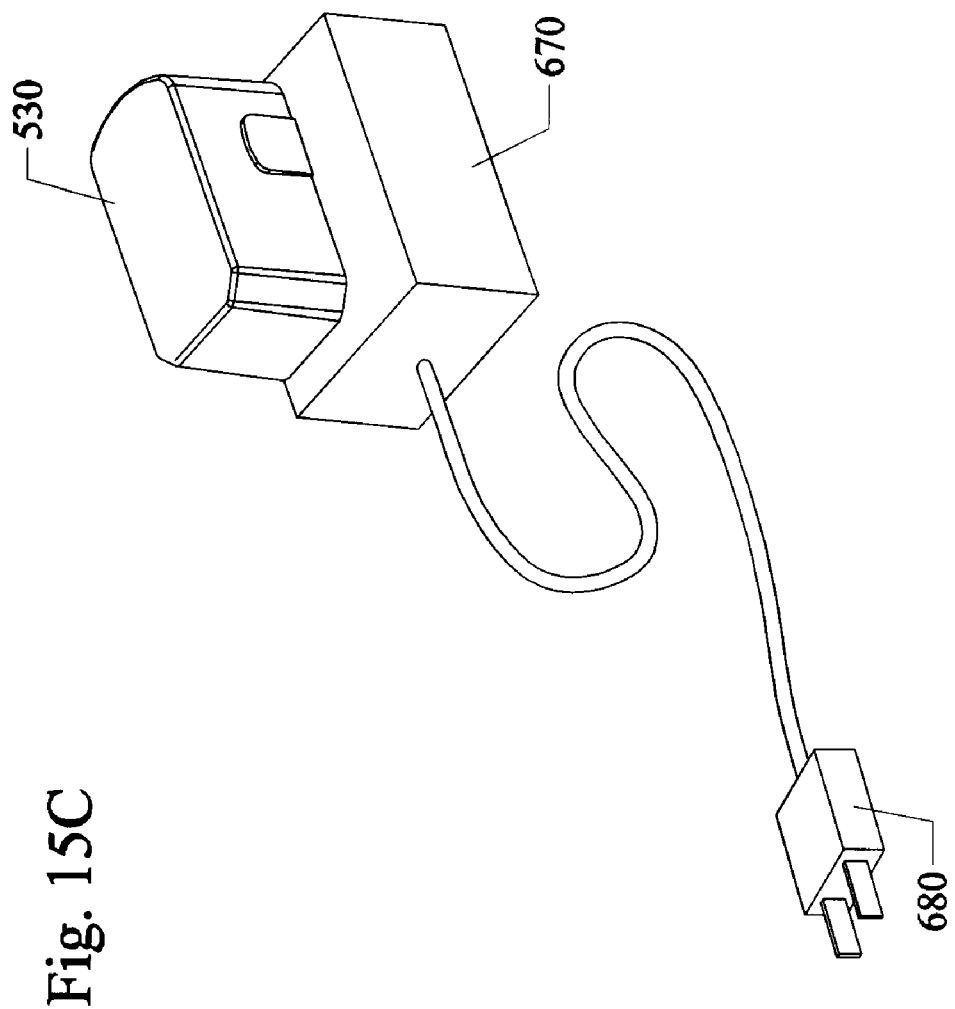
FIG. 15C shows the rechargeable battery pack and AC powered battery charger of FIG. 15B attached to one another.
Figure 17:
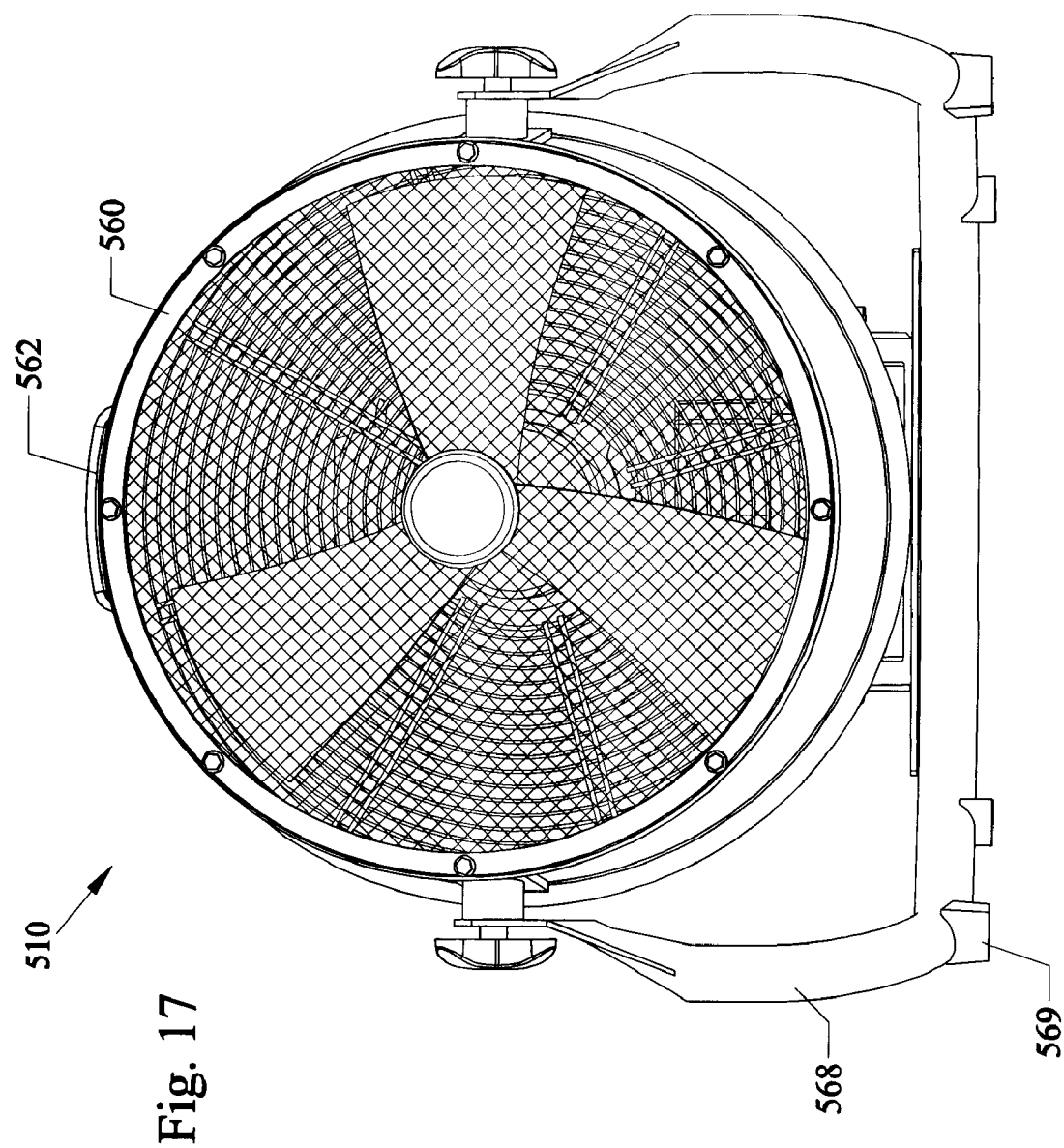
FIG. 17 shows a front view of the DC fan of FIG. 16.
Figure 18:
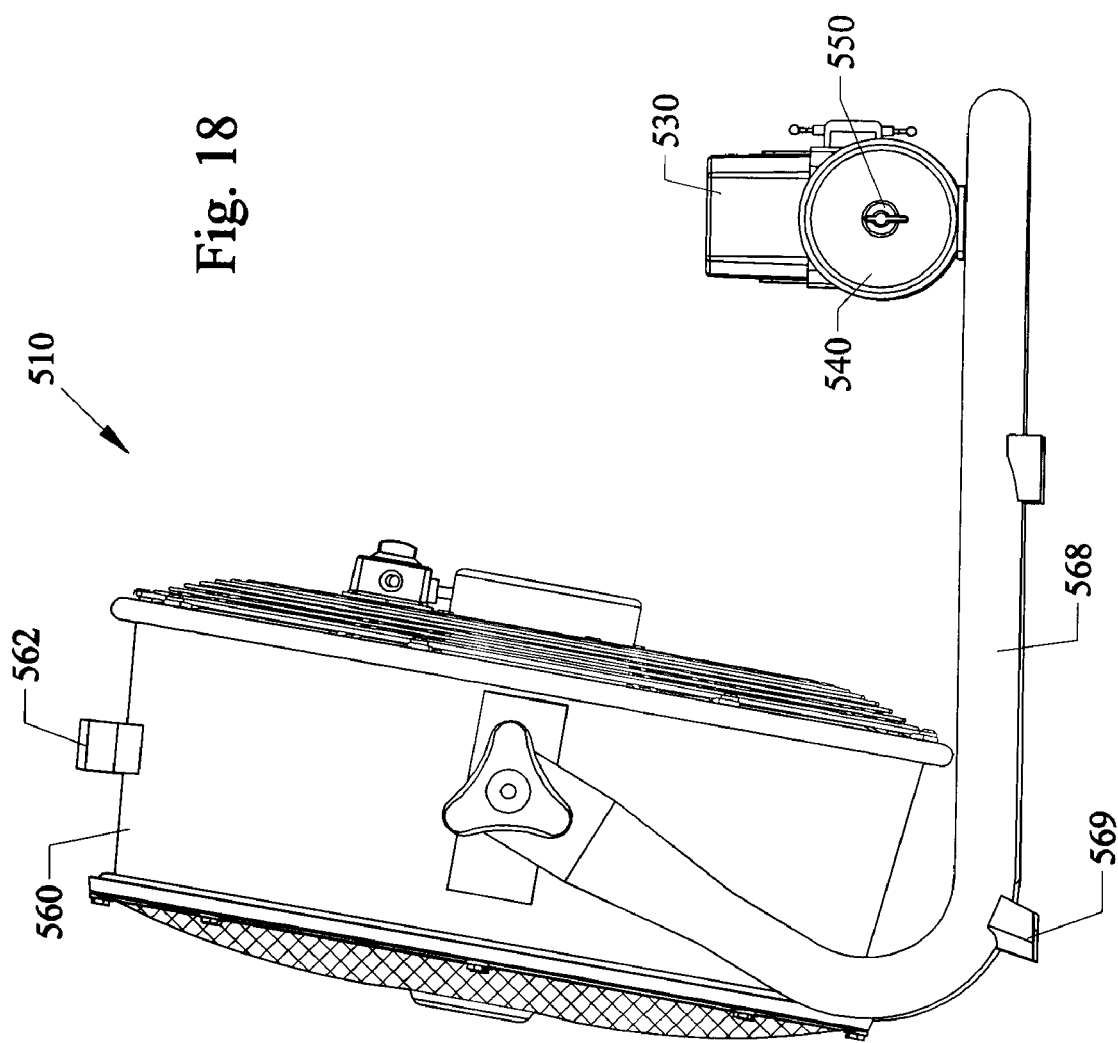
FIG. 18 shows a right view of the DC fan of FIG. 16.
Figure 19:
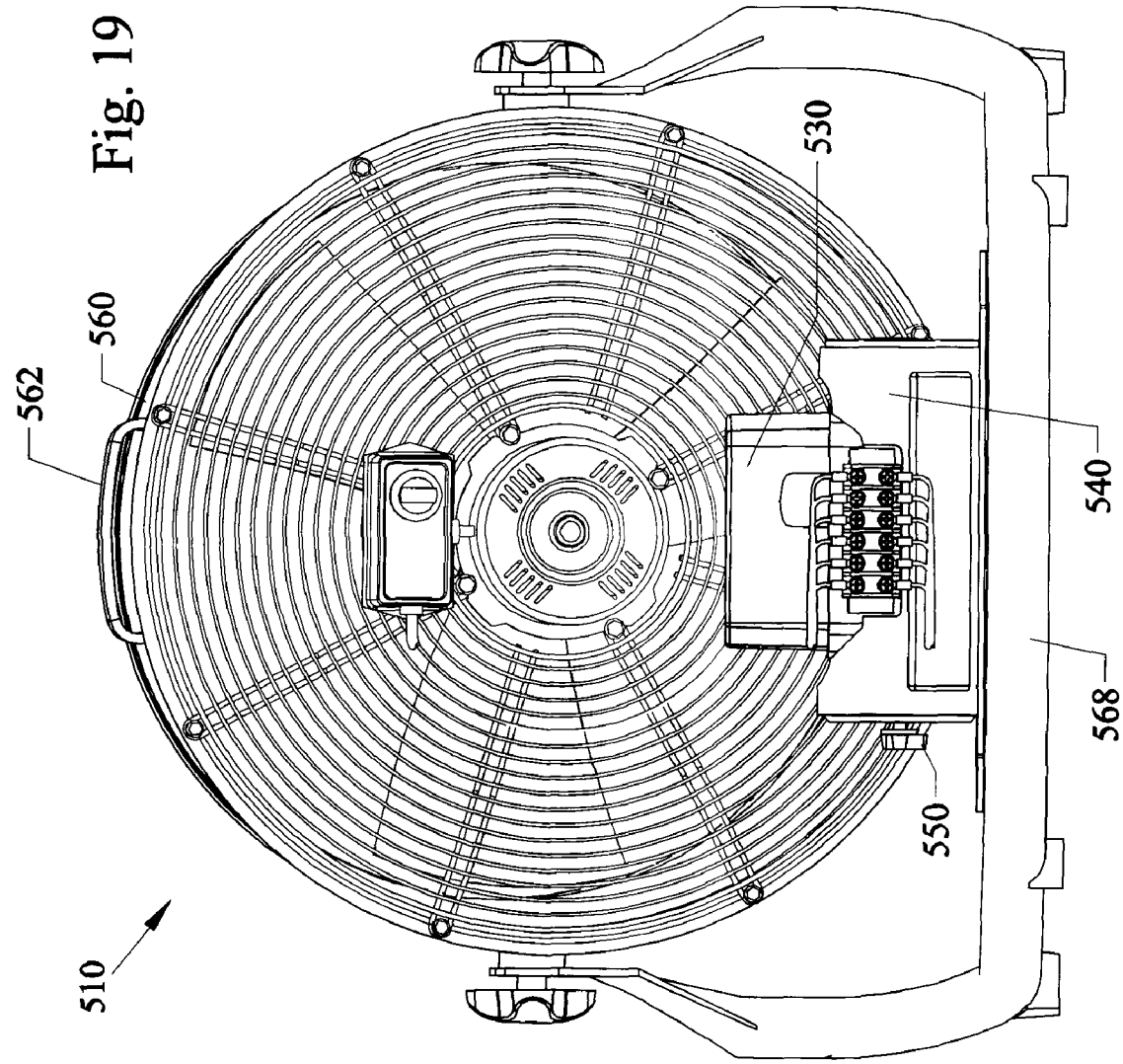
FIG. 19 shows a rear view of the DC fan of FIG. 16.

FIG. 12 is a front perspective view 500 of DC powered fan assembly 510 with portable solar panel assembly 520. FIG. 13 is a rear perspective view of FIG. 12. FIG. 14 is a rear perspective view showing charge cables 640, 650 disconnected. FIG. 15A is a rear perspective view showing the rechargeable battery pack 530 separated from DC power supply 540. FIG. 15B shows the rechargeable battery pack 530 and AC powered battery charger 670 detached from one another. FIG. 15C shows the rechargeable battery pack 530 and AC powered battery charger 670 of FIG. 15B attached to one another. FIG. 16 shows a left side view of the DC fan assembly 510 of FIG. 12. FIG. 17 shows a front view of the DC fan assembly 510 of FIG. 16. FIG. 18 shows a right view of the DC fan assembly 510 of FIG. 16. FIG. 19 shows a rear view of the DC fan assembly 510 of FIG. 16.

Referring to FIGS. 12-19, the portable embodiment 500 can include the combination of a battery powered fan assembly 510 with a portable solar panel assembly 520. The portable solar panel assembly 520 can include a carrying case having a generally rectangular configuration with a handle 600 and having a solar panel 570 that can mounted to an inside of a thin depth rectangular box 575. The bottom edges of the rear box 575 can be attached to a solar panel cover 580 with a cover hinge pin(s) 690. The cover 580 can have angled side edges 582, 588 with an open end portion 585, where the side edges can wrap about the outer side walls 572, 578 of the rear box 575.

Across the back of the carrying panel assembly 520 can be horizontal support bar 574, that has a support stand 590 attached thereto. Attached to the support bar 574 can be cylindrical tabs 591, 599, with inwardly angled ends 592, 598 pivotally attached thereto. There are two vertical side legs 594, 596 that extend downward with a horizontal bottom leg 595 attached to the bottoms of the two vertical side legs 594, 596. A handle 600 on top of the base 575 allows for the panel assembly 520 to be easily hand carried. The carrying case configuration allows for the panel(s) to be easily transported in a secure and safe manner and contains the solar panel(s) in a briefcase type housing.

Attached to the back of the panel assembly 520 is a solar charge cable 630A that attaches to another solar charge cable 630B by a plug and socket connector 640. The second charge cable 630B can be attached to a DC power supply 540 that powers fan assembly 510 by another cable 545, where the DC power supply 540 can be powered by a rechargeable battery pack 530. The battery pack 530 can be attached to a wall plug with transformer 660 by a charge cables 620B, 620A that can be attached to one another by another plug and socket connector 650. When the battery pack 530 is charged a switch 550 on the DC power supply 540 can switch on power to the motor 565 to the fan 560.

Referring to FIGS. 15A-15C, the rechargeable battery pack 530 can be charged when not being used by having a plug portion 532 that plugs into a receptacle 675 on an AC powered battery charger 670, the latter of which can be plugged into a wall power supply by AC wall plug 680. Referring to FIGS. 12-31, the rechargeable backup power pack 530 can be used to run the fan assembly 520 when solar power is not available such as during night-time. The fan 560 can be powered by the solar panel 570. Additionally, the rechargeable backup power pack 530 can also be recharged by the solar panel 570. With the backup power pack 530 charged the fan can be also used indoors as well as when wall power supplies are no longer available. Also, with the plug/transformer 660, the fan assembly 510 can be powered directly by a wall power supply and not need the use of either the rechargeable battery pack or the solar panel.

Referring to FIGS. 12-19, a fan speed switch 610 on the back of the drum fan 560 can control operational speeds of the blades. The blades can be similar in size and dimensions to those previously described, and include twisted blades for enhanced airflow.

A carrying handle 562 on top of the cylindrical drum fan housing 560 can allow for the drum fan assembly 510 to be easily carried. A U shaped floor stand 568 having upper bent ends can be pivotally attached to opposite sides of the cylindrical drum fan housing 560. The bottom of the flat U shaped floor stand 568 can be supported off the floor by rubber footers 569. The DC power supply 540 can be fixably mounted to an upper portion of the U shaped floor stand 568, so that the power supply 540 can be carried with the drum fan 560 by the carrying handle 562 on the drum fan assembly 510.

Figure 20:
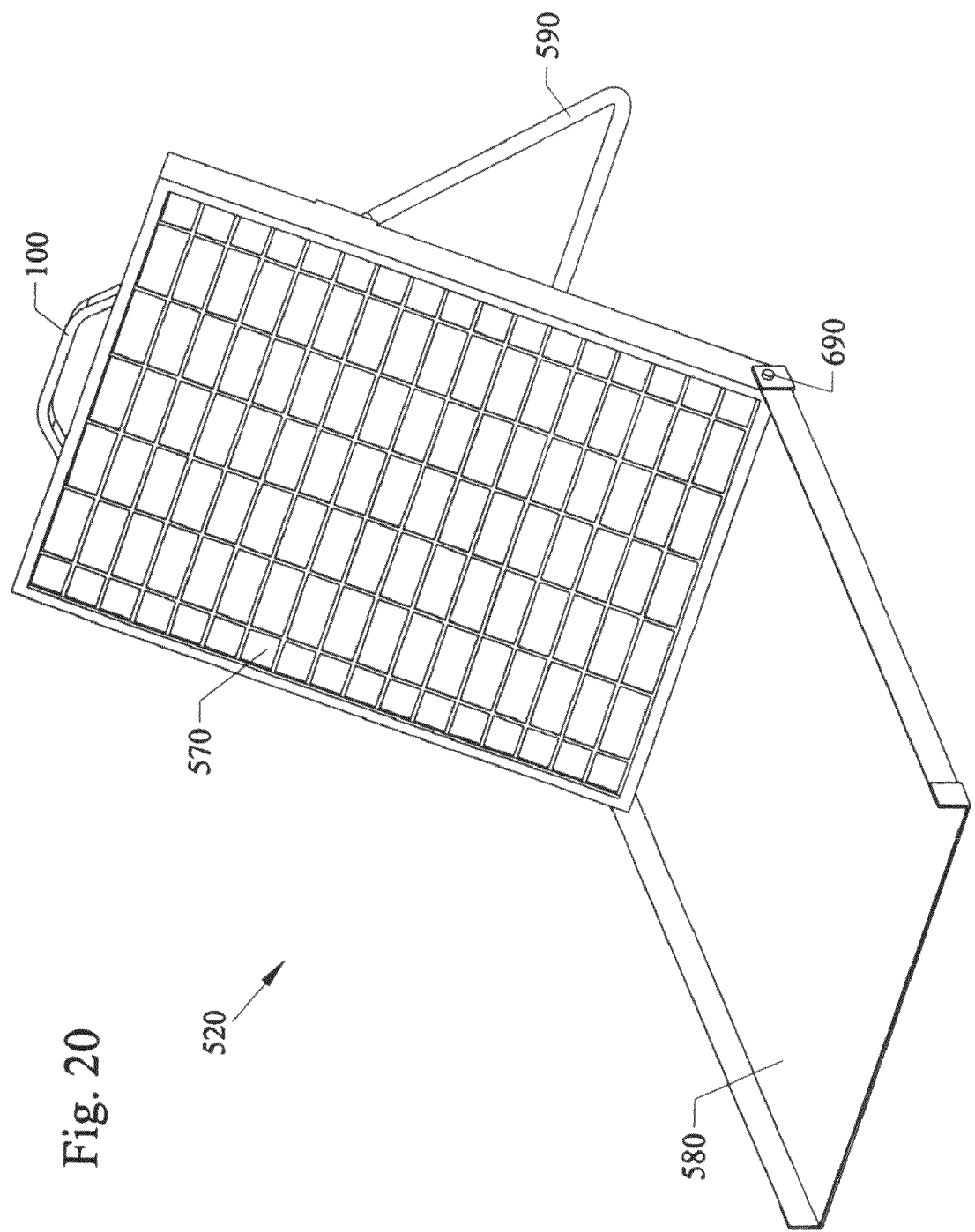
FIG. 20 is a front perspective view of the portable solar panel assembly deployed.
Figure 21:
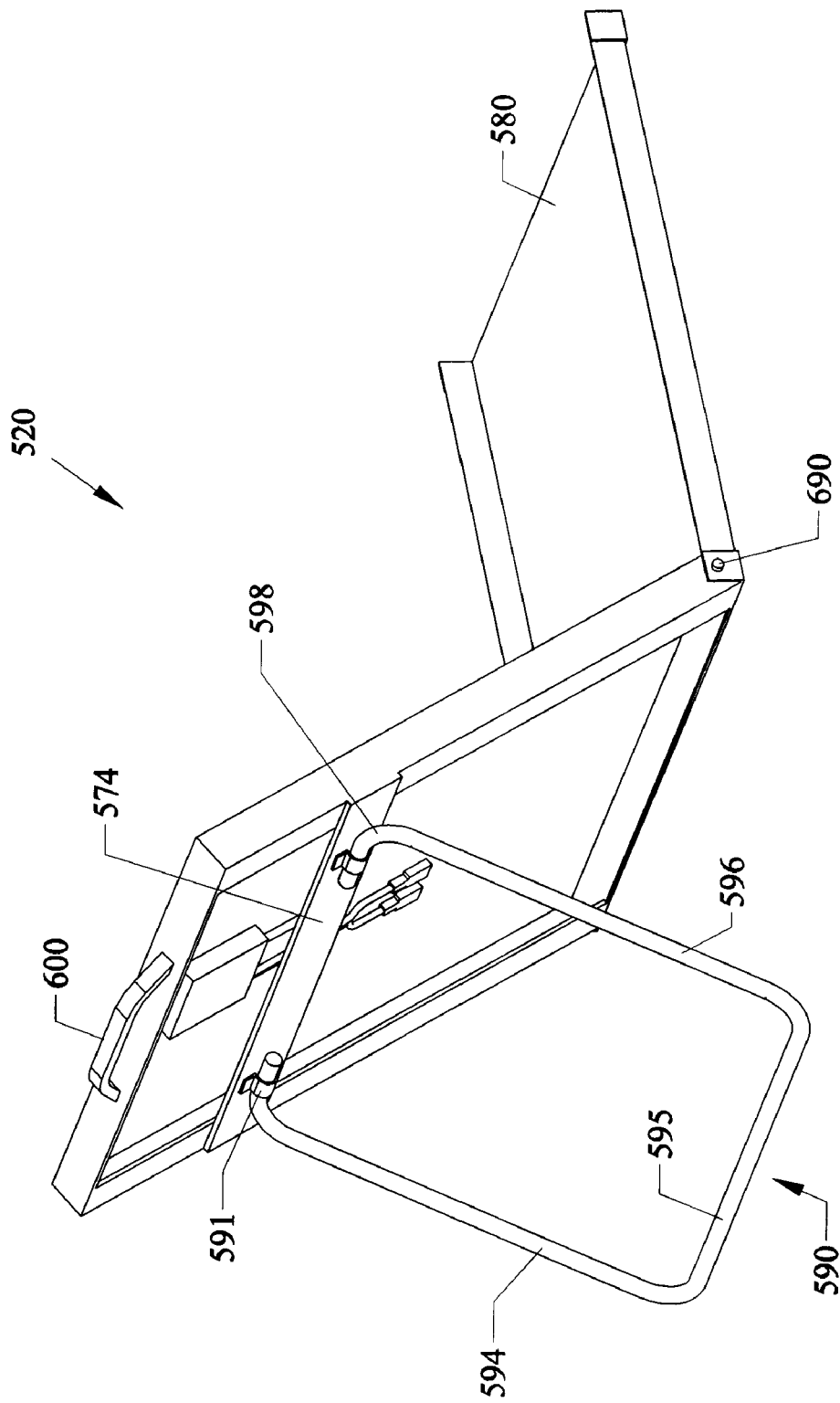
FIG. 21 is a rear perspective view of the portable solar panel assembly deployed.
Figure 25:
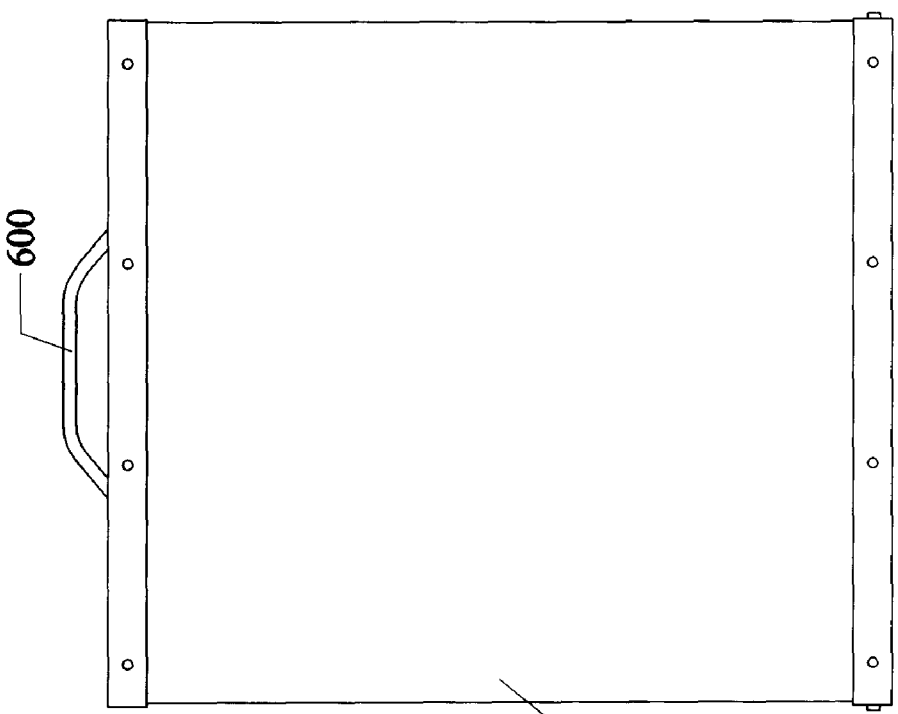
FIG. 25 is a front view of the folded solar panel assembly.
Figure 24:
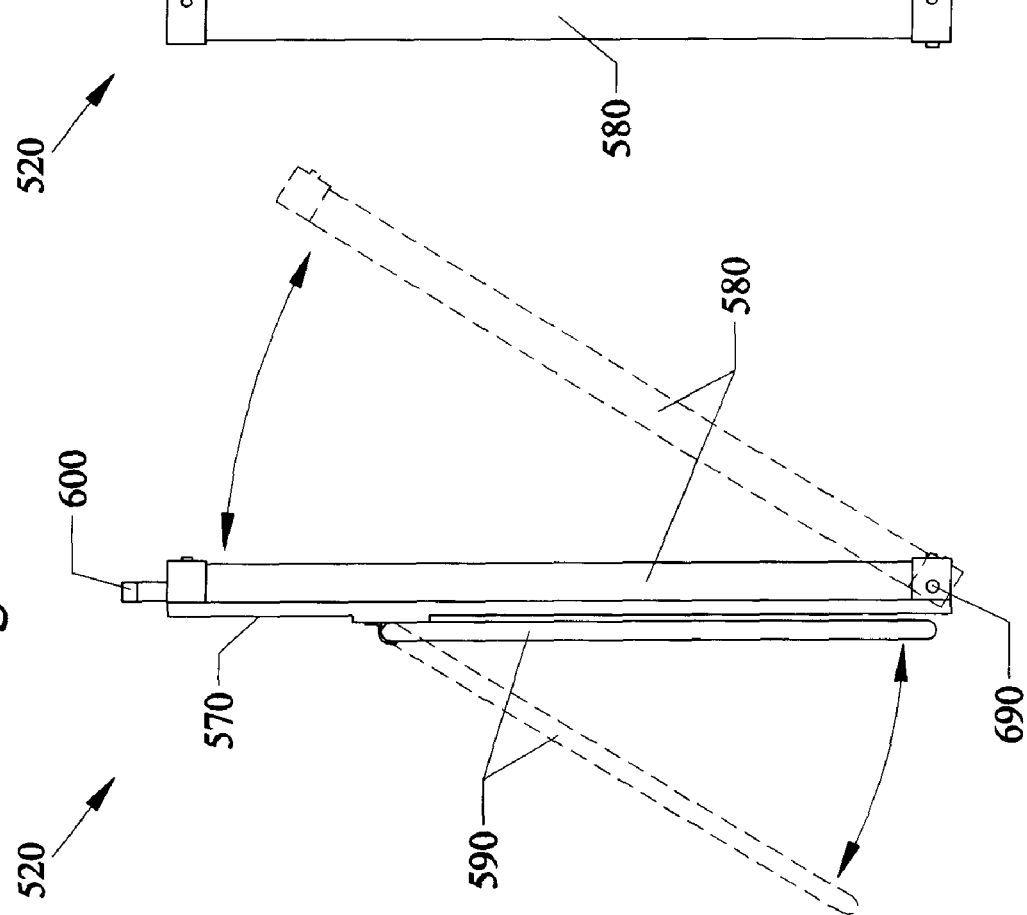
FIG. 24 is a left side view of the solar panel assembly folded with ghosted leg and cover function.
Figure 26:
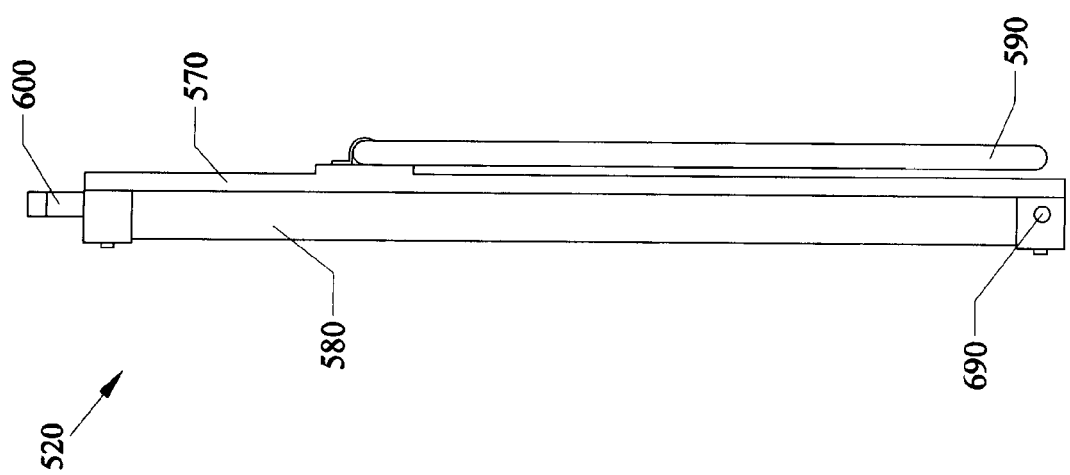
FIG. 26 is a right side view of the folded solar panel assembly.
Figure 27:
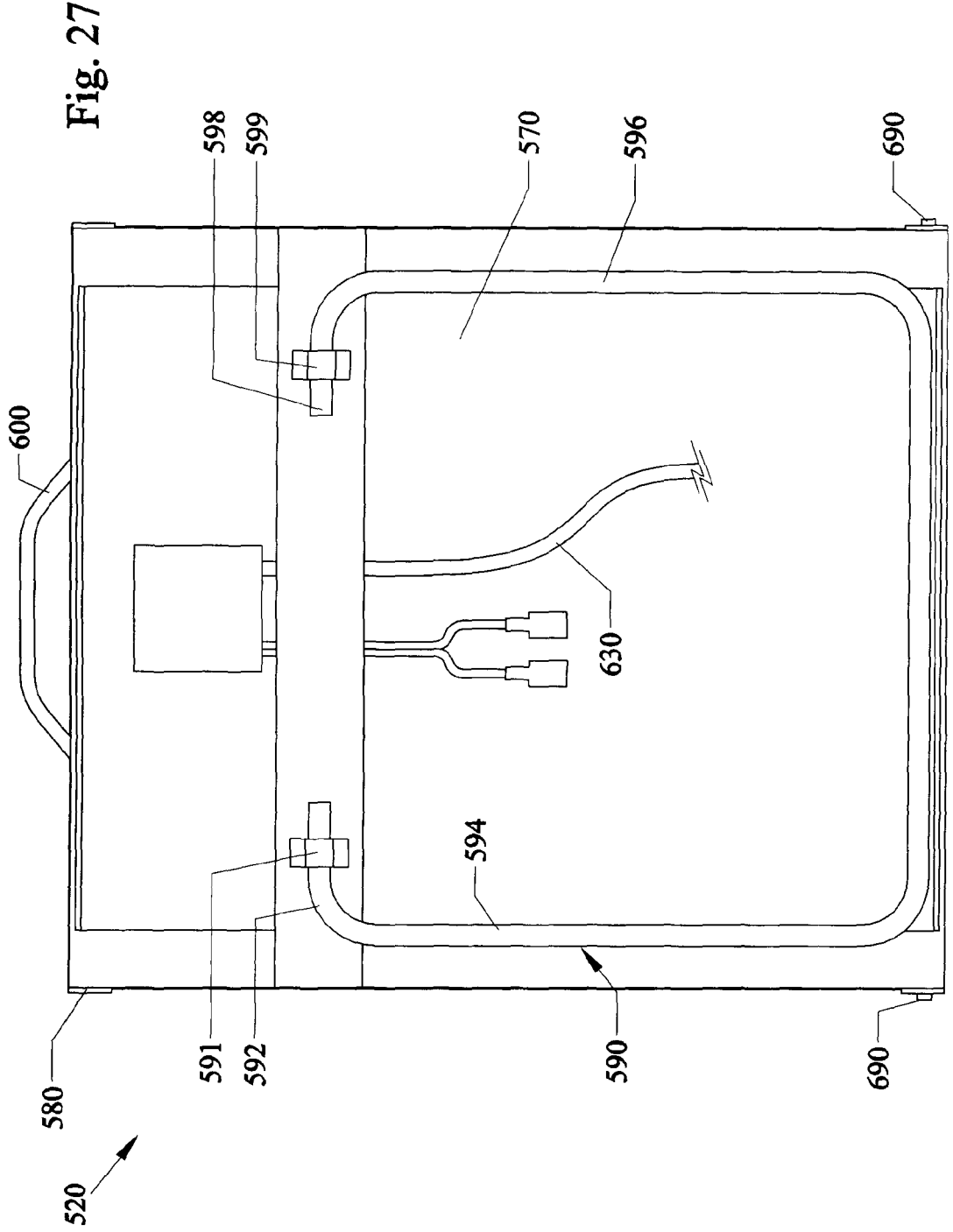
FIG. 27 is a rear view of the folded solar panel assembly.
Figure 28:
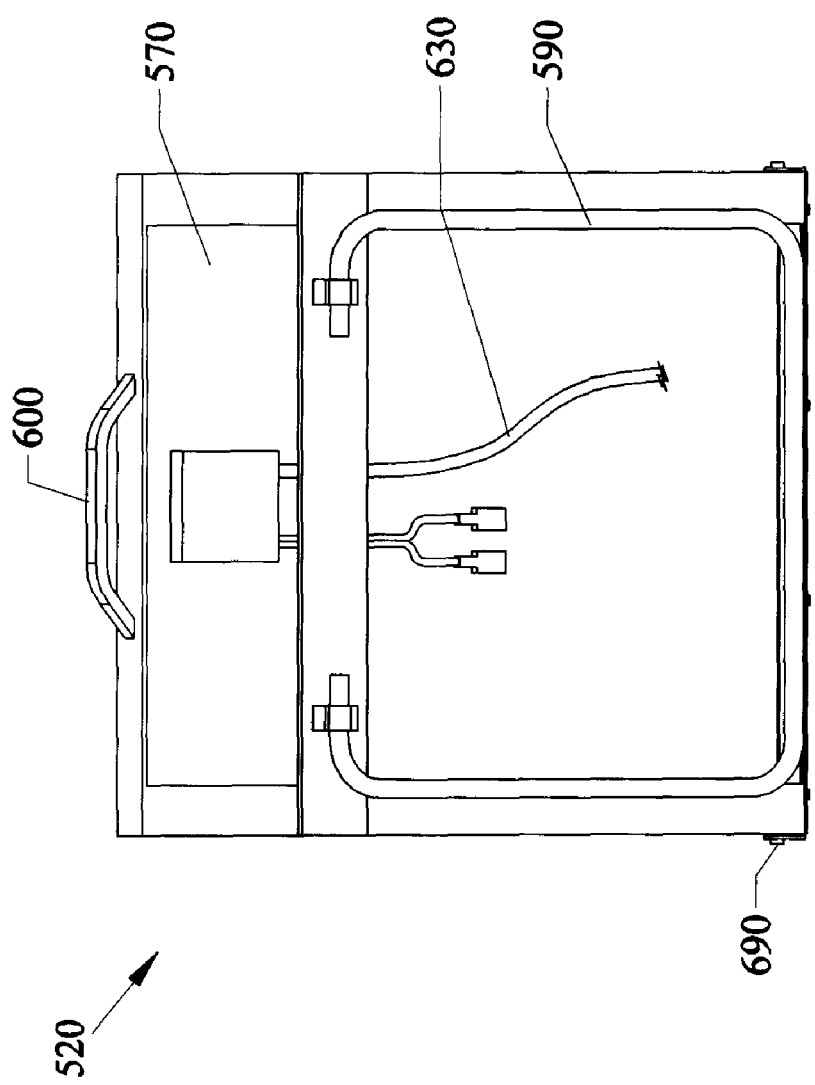
FIG. 28 is another rear view of the folded solar panel assembly.

FIG. 20 is a front perspective view of the portable solar panel assembly 520 deployed. FIG. 21 is a rear perspective view of the portable solar panel assembly 520 deployed. FIG. 22 is a front perspective view of the portable solar panel assembly 520 folded for transport. FIG. 23 is a rear perspective view of the portable solar panel assembly 520 folded for transport. FIG. 24 is a left side view of the solar panel assembly 520 folded with ghosted leg 590 and cover 580 in closed and deployed positions. FIG. 25 is a front view of the folded solar panel assembly 520. FIG. 26 is a right side view of the folded solar panel assembly 520. FIG. 27 is a rear view of the folded solar panel assembly 520. FIG. 28 is another rear view of the folded solar panel assembly 520.

Figure 29:
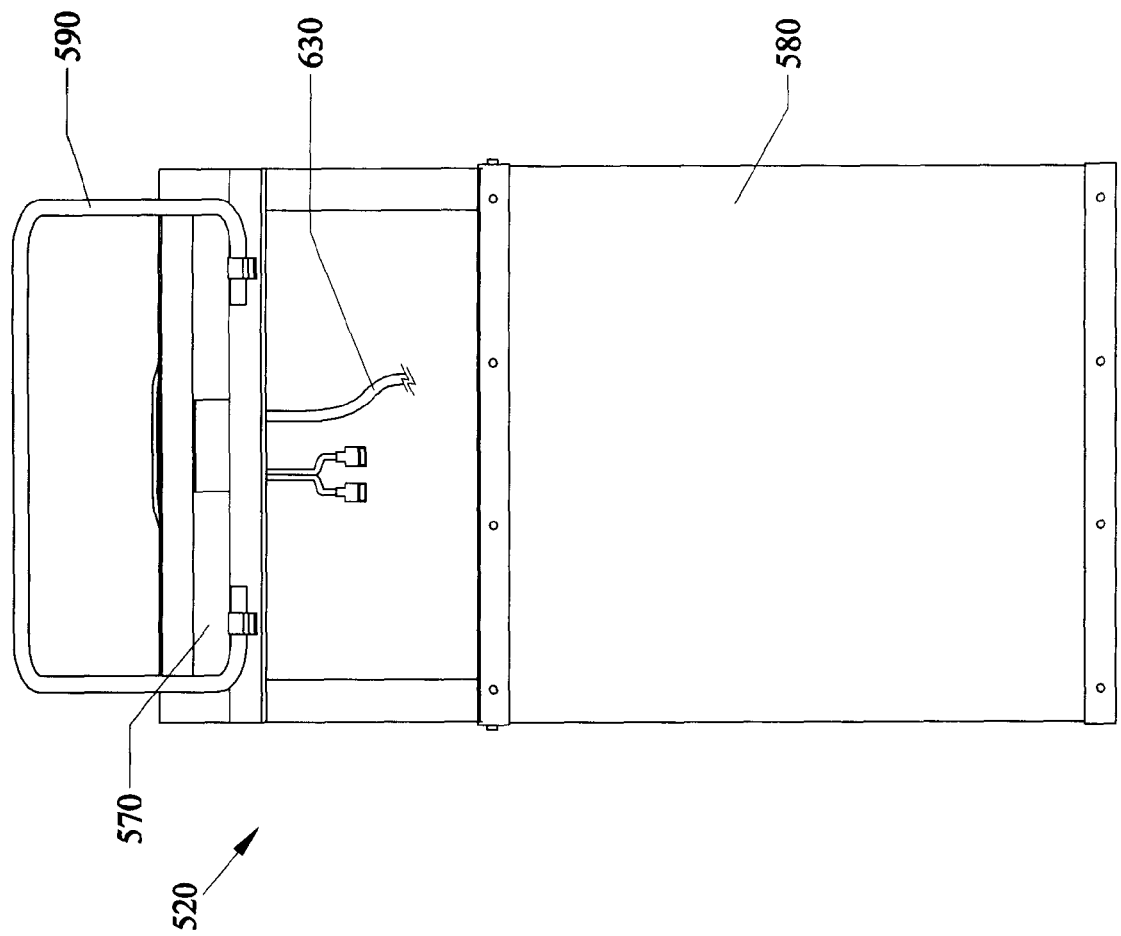
FIG. 29 is a bottom view of the deployed solar panel assembly.
Figure 30:
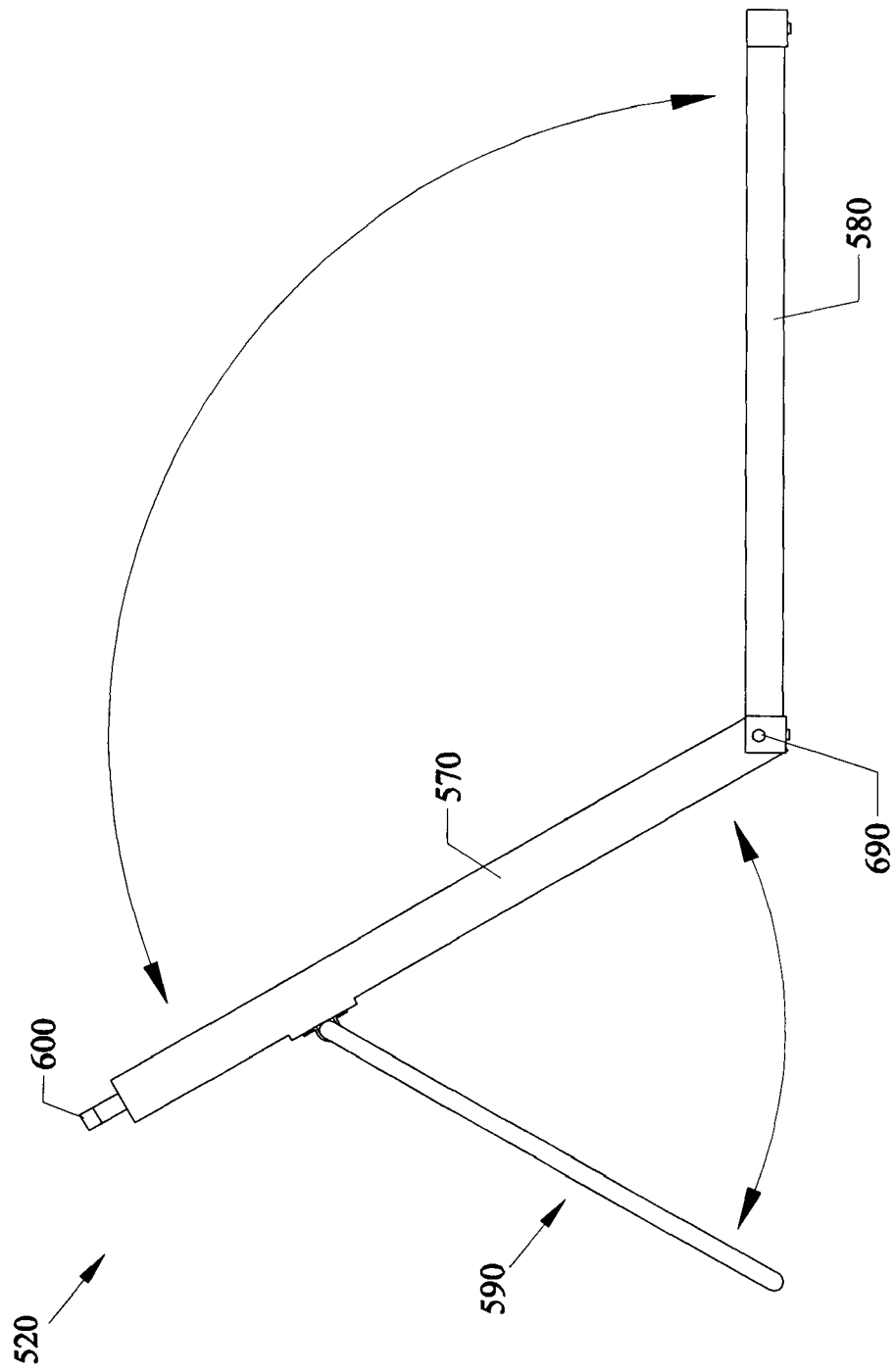
FIG. 30 is a side view of the deployed solar panel assembly.

FIG. 29 is a bottom view of the solar panel assembly 520 in a deployed position. FIG. 30 is a side view of the solar panel assembly 520 in a deployed position. FIG. 31 is a front view of the solar panel assembly 520 in a deployed position.

Referring to FIGS. 20-31, the solar panel carrying case assembly 520 can include cylindrical tabs 591, 599 attached with a support bar 574 on the back 575 of a rectangular box, with inwardly angled ends 592, 598 pivotally attached thereto. Two vertical side legs 594, 596 that extend downward with a horizontal bottom leg 595 attached to the bottoms of the two vertical side legs 594, 596. The stand components 592-598 can have a U-shape that can fold substantially flush against the back of the rectangular box 575 when not being used to allow the assembly 520 to be easily carried similar to a briefcase by the handle 600. The pivotal hinge portions 591, 599 allow for the stand components 592-598 to be set at different deployed angles so that the solar panel 570 can be oriented at different selected angles.

Referring to FIGS. 12-31, the novel fan assembly 510 and panel assembly 520 can be carried by a single person using the respective handles 562, 600, allowing the invention to be easily transported as a portable fan that can be used wherever needed.

While the preferred embodiments describe the fan as having plastic blades and a plastic hub molded into a single unit, the invention can have separate blades attached to a separate hub. While the blades are described as preferably being made from plastic, the blades can be made from composite materials and/or from other materials, such as but not limited to metals, and the like. Metal materials that can be used include but are not limited to aluminum, galvanized metal, steel, and the like.

Although the preferred embodiments show the fan with three twisted blades, the invention can apply to fans having two blades, four blades or more.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A portable fan assembly comprising:
    a fan housing having fan blades attached to a motor, the fan housing having one carrying handle; and
    a separate portable rectangular carrying case having a front rigid half wall section hingedly attached to a rear rigid half wall section, the front half wall section having left and right rigid angled side edges and an open end with no angled side edges, the left and right rigid angled side edges wrap about outer side walls of the rear half wall section when the front half wall section and the rear half wall section are in a closed position; the front wall section folds downward into an open position; a solar panel being mounted inside of the case and attached to the rear half section; the front half wall section containing no solar panel mounted thereon, the solar panel for providing power to the motor, the solar panel being used when the front wall section is in the open position, and one carrying handle projecting upward from the rigid half wall section of the carrying case between the open end of the front half wall section, and wherein the fan and panel are adapted to be carried by a single user.

2. The portable fan assembly of claim 1, wherein the fan blades include:
    a plurality of twisted blades attached to the motor, each blade having a twist between a root end and a tip end.

3. The portable fan assembly of claim 2, wherein the blades include:
    a diameter across tip ends of the blades of approximately 15 inches.

4. The portable fan assembly of claim 1, wherein the fan housing is in the form of
    a cylindrical housing for mounting the blades and motor therein; and wherein the fan further includes
    a U-shaped stand having upwardly bent ends pivotally attached to opposite sides of the cylindrical housing for supporting the fan over a ground surface.

5. The portable fan assembly of claim 1, wherein the solar panel includes:
    a leg assembly pivotally attached across a back of the solar panel; the leg assembly having a folded position with the leg assembly substantially flush against the back, and a deployed position with the leg assembly at a bent angle so that the solar panel is oriented at a selected position.

6. The portable fan assembly of claim 5, wherein the leg assembly includes:
    a U-shape having inwardly projecting angled ends pivotally attached to cylindrical tabs located on the back of the solar panel, the U-shape having a lower horizontal leg portion for allowing the leg assembly to be supported over the ground surface.

7. The portable fan assembly of claim 5, wherein the leg assembly includes:
    a U-shaped configuration having two upper ends; each of the upper ends having inwardly angled edges that pivotally attach to cylindrical tabs that are mounted behind the rear half section of the carrying case.

8. The portable fan assembly of claim 1, further comprising:
    a rechargeable battery power supply for providing power to the motor of the fan when the solar panel is not being used.

9. The portable fan assembly of claim 1, further comprising:
    a charging adapter having a wall plug for recharging the battery power supply.

10. The portable fan assembly of claim 1, further comprising:
    a wall plug adapter for directly providing power to the fan and bypassing the solar panel, so that the solar panel is not needed.

11. A portable modular fan system, comprising:
    a single fan assembly having fan blades attached to a motor, the fan having a carrying handle, and a pivotally attached floor stand for allowing the fan to be oriented at different angles;
    a separate portable rectangular carrying case having a solar panel, the carrying case having a single carrying handle, and pivotally attached leg assembly, the leg assembly having inwardly protruding upper ends that are rotatable attached to cylindrical tabs that are spaced between side ends of a rear side of the carrying case, the leg assembly having a folded position with the leg assembly substantially flush against the rear side of the carrying case, the leg assembly having a deployed position with the solar panel being pivotal to different angles, the solar panel for providing power to the motor, wherein the fan and panel are adapted to be carried by a single user; and a power supply with a removable battery mounted on the floor stand of the single fan assembly.

12. The portable modular fan system of claim 11, wherein the carrying case includes a front half wall section hingedly attached to a rear half wall section, the front half wall section having left and right rigid angled side edges and an open end with no angled side edges, the left and right rigid angled side edges wrap about outer side walls of the rear half wall section when the front half wall section and the rear half wall section are in a closed position, the front wall section folds downward into an open position, the solar panel being mounted inside of the case and attached to the rear half section, the handle projecting upward from the rear half wall section within the open end of the front half wall section of the carrying case, wherein the front wall section folds downward into an open position when the solar panel is being used.

13. A method of providing a portable fan and solar power supply, comprising the steps of:
    providing a fan housing having a plurality of blades mounted to a single motor, the blades being held within a grilled cage;
    mounting a single handle on top of the fan housing;
    providing a solar panel in a rectangular case;

providing the case with a front half wall section having left and right angled side edges, and an open end, and a rear half wall section, the rear half wall section having the solar panel mounted thereon, and the front half wall section containing no solar panel mounted thereon;

hingedly attaching the front half wall section to a rear half wall section;

wrapping the left and right angled side edges about outer side walls of the rear half wall section when the front half wall section and the rear half wall section are in a closed position;

mounting another single handle on the rear half wall section of the rectangular case;

extending the another single handle up from the open end of the front half wall section when the front half wall section and the rear half wall section of the rectangular case are in the closed position;

operating the solar panel when the front half wall section is folded downward from the rear hall wall section when the rectangular case is in an open position;

carrying the fan housing by gripping the single fan housing handle; and carrying the rectangular case by gripping the single rectangular case handle.

14. The method of claim 13, further including the steps of:

providing a U-shaped leg assembly with inwardly protruding upper ends;

pivotally attaching the inwardly protruding upper ends of the leg assembly to cylindrical tabs behind the rear half wall section of the case; and unfolding the leg assembly as a stand for the case when the solar panel is used.

* * * * *